US012646120B2

(12) United States Patent
Hayeck et al.

(10) Patent No.: US 12,646,120 B2
(45) Date of Patent: Jun. 2, 2026

(54) DISTRIBUTED BENEFITS COVERAGE VALIDATION APPARATUSES, PROCESSES AND SYSTEMS

(71) Applicant: FMR LLC, Boston, MA (US)

(72) Inventors: Michael Hayeck, Chatham, MA (US); Jennifer Gueldner, Salt Lake City, UT (US); Christopher McGahon, Dublin (IE); Kristen Engles, Cohasset, MA (US)

(73) Assignee: FMR LLC, Boston, MA (US)

( * ) Notice: Subject to any disclaimer, the term of this patent is extended or adjusted under 35 U.S.C. 154(b) by 146 days.

(21) Appl. No.: 18/220,118

(22) Filed: Jul. 10, 2023

(65) Prior Publication Data

US 2025/0022064 A1      Jan. 16, 2025

(51) Int. Cl.
*G06Q 40/08* (2012.01)
*H04L 9/40* (2022.01)

(52) U.S. Cl.
CPC ......... *G06Q 40/08* (2013.01); *H04L 63/0428* (2013.01); *G06Q 2220/10* (2013.01)

(58) Field of Classification Search
CPC .. G06Q 40/00–128; G06Q 2220/00–18; H04L 63/00–308
See application file for complete search history.

(56) References Cited

U.S. PATENT DOCUMENTS

| | | | | |
|---|---|---|---|---|
| 10,102,526 | B1 * | 10/2018 | Madisetti | G06Q 20/389 |
| 12,100,049 | B2 * | 9/2024 | Gabler | G06Q 20/204 |
| 2016/0285835 | A1 * | 9/2016 | Linga | G06F 21/6218 |
| 2016/0294548 | A1 * | 10/2016 | Qian | H04L 63/062 |
| 2019/0164151 | A1 * | 5/2019 | Doney | H04L 9/50 |
| 2021/0350913 | A1 * | 11/2021 | Breen | G06Q 20/0855 |
| 2021/0383482 | A1 * | 12/2021 | Gabler | G06Q 20/20 |
| 2022/0005023 | A1 * | 1/2022 | Angelos | G06Q 20/4014 |
| 2022/0036471 | A1 * | 2/2022 | Liu | G06Q 20/3829 |
| 2022/0188816 | A1 * | 6/2022 | McFarlane | G06Q 20/40 |
| 2023/0237471 | A1 * | 7/2023 | Siedleczka | G06Q 20/389 |
| | | | | 705/75 |

* cited by examiner

*Primary Examiner* — Chenyuh Kuo
(74) *Attorney, Agent, or Firm* — Hanchuk Kheit LLP.; Walter G. Hanchuk

(57) ABSTRACT

The Distributed Benefits Coverage Validation Apparatuses, Processes and Systems ("DBCV") transforms provider info, add provider transaction request, employee subscriber ID card data datastructure/inputs via DBCV components into add provider transaction response, benefit coverage validation notification outputs. A benefit coverage validation request datastructure structured to specify subscriber ID card data associated with a beneficiary is obtained. A blockchain address of a smart contract associated with the beneficiary is determined via the subscriber ID card data. Encrypted benefit coverage data associated with the beneficiary is obtained by sending a blockchain transaction to the blockchain address of the smart contract. An encryption key corresponding to the encrypted benefit coverage data is obtained from a key management server. The encrypted benefit coverage data associated with the beneficiary is decrypted with the encryption key. The decrypted benefit coverage data is evaluated to determine a benefit status corresponding to a benefit provided by a provider.

18 Claims, 16 Drawing Sheets

DBCV ARCHITECTURE

FIGURE 1: DBCV ARCHITECTURE

FIGURE 6A: DBCV DATA FLOW

Key Management Server 610

Blockchain 608

Provider Client 606

Employee Client 604

Barcode Medium 602

Provider Info 621

(1)

(2)

Provider Access Authorization Granting (PAAG) Component 625

Add Provider Transaction Request 629

(3)

Add Provider Transaction Response 633

(4)

Employee Subscriber ID Card Data 637

(5)

(6)

Employee Benefit Coverage Validating (EBCV) Component 641

Benefit Coverage Data Request 645

(7)

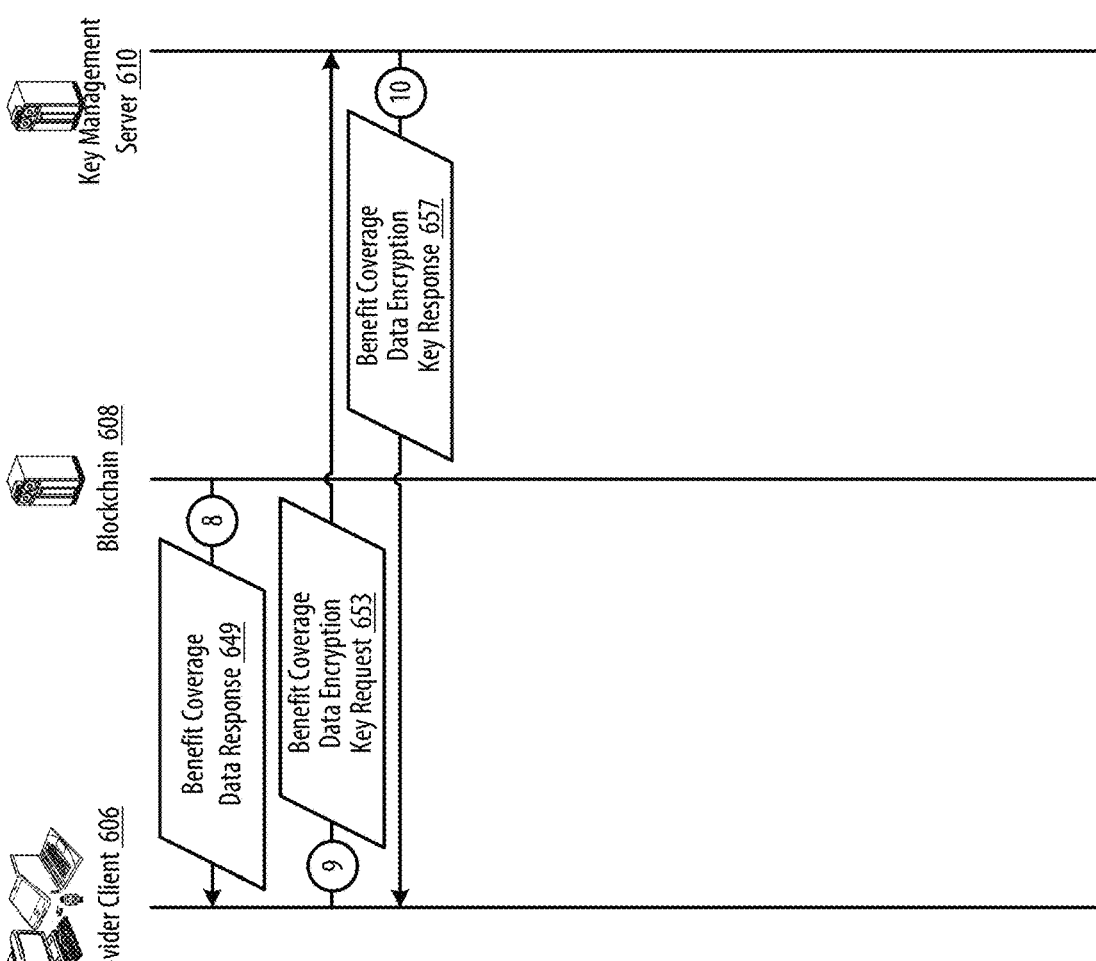
FIGURE 6B: DBCV DATA FLOW

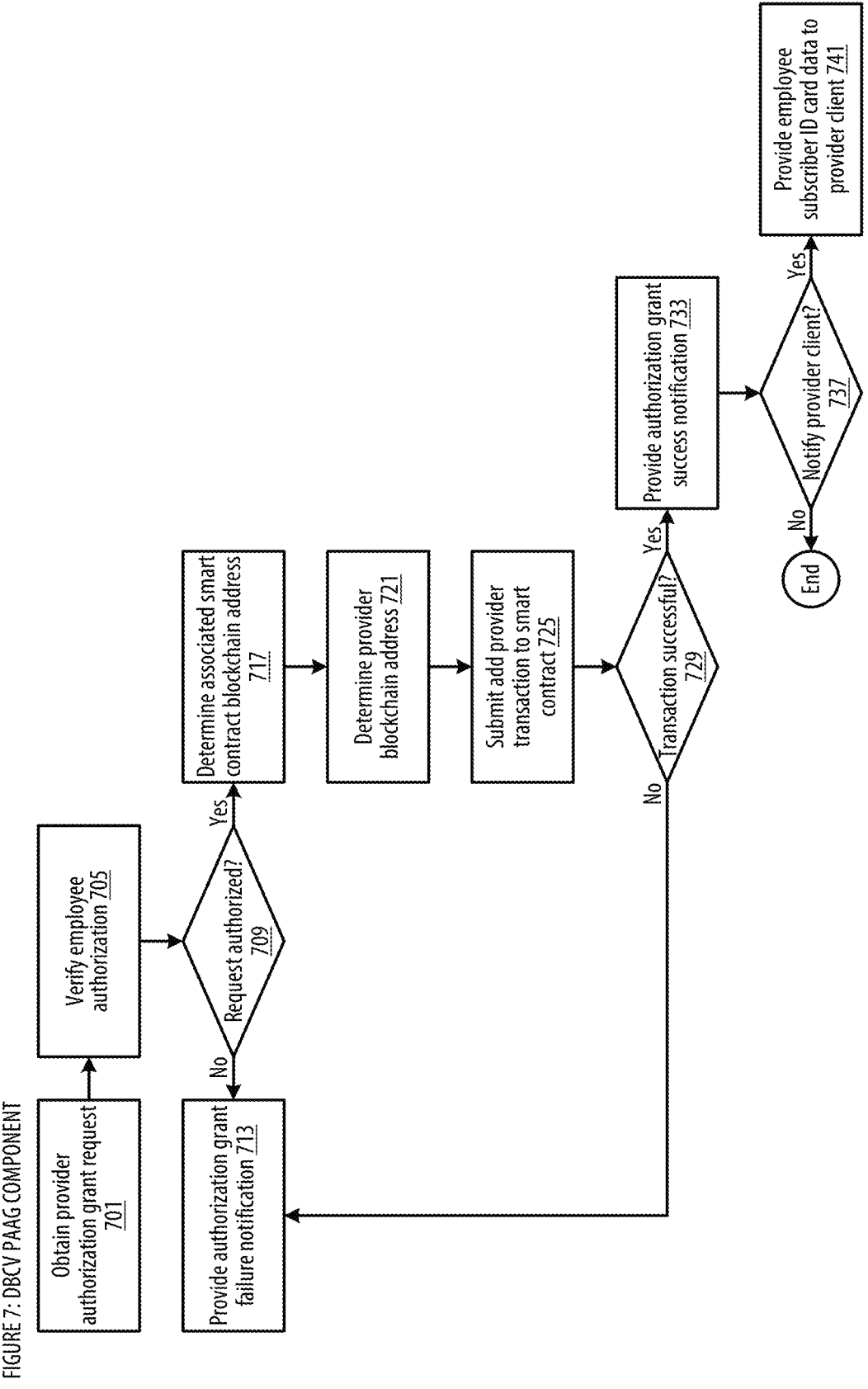
FIGURE 7: DBCV PAAG COMPONENT

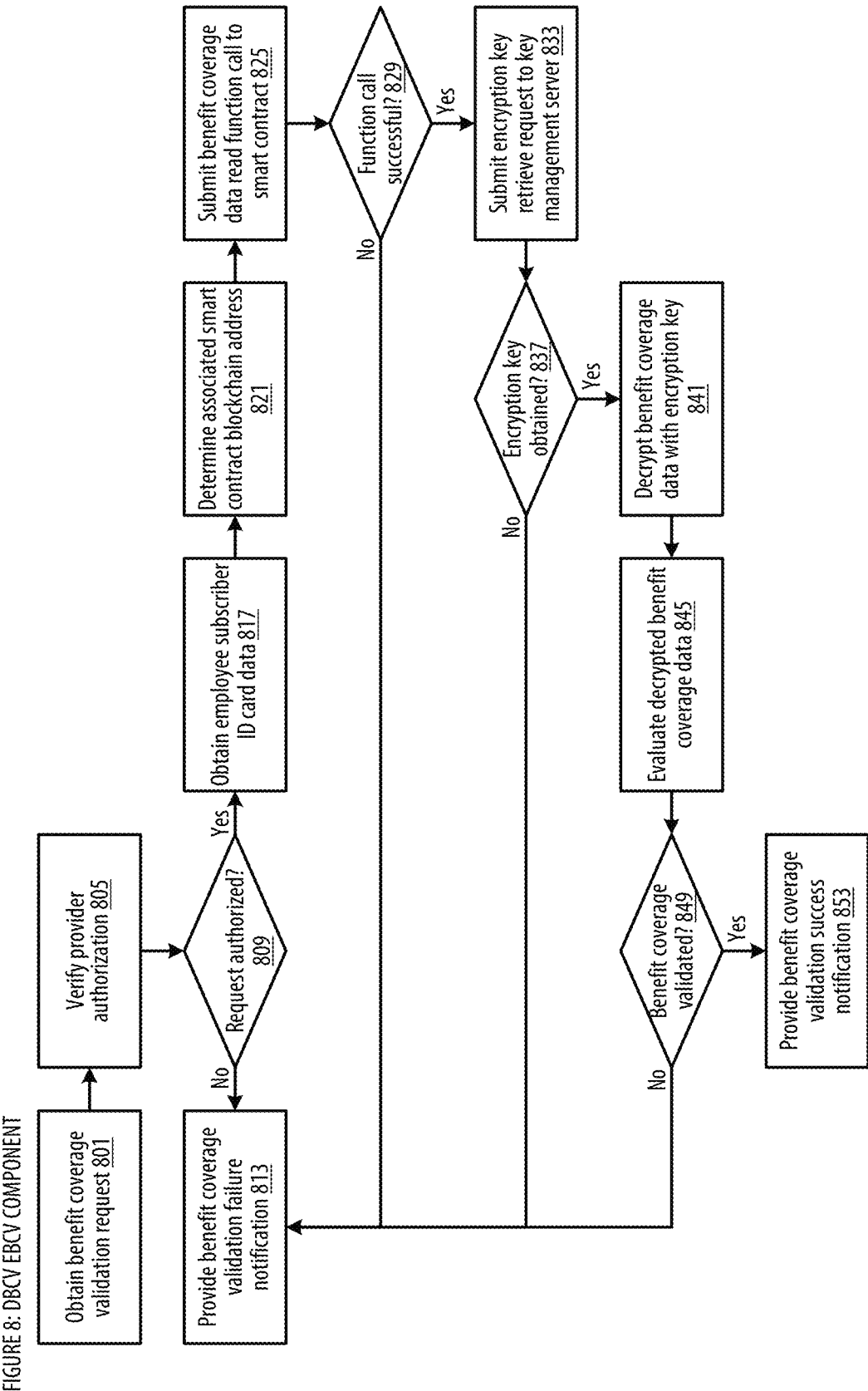
FIGURE 8: DBCV EBCV COMPONENT

FIGURE 9: DBCV IMPLEMENTATION CASE

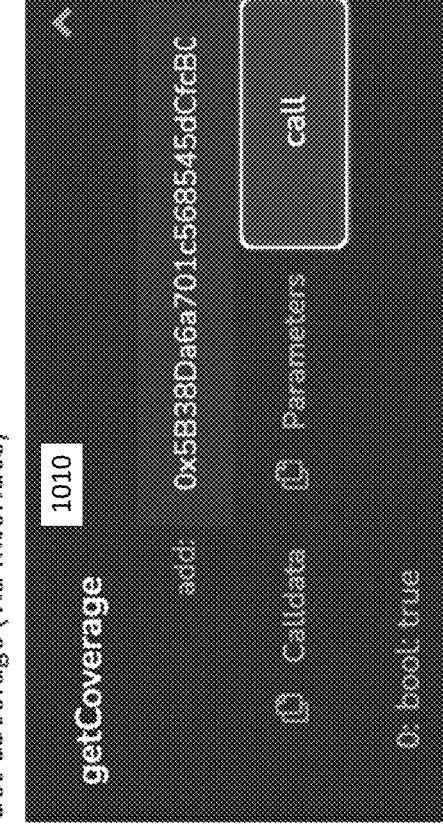
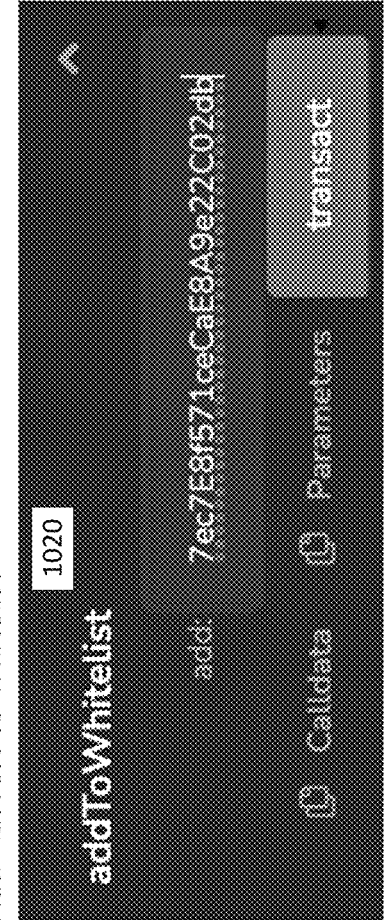
FIGURE 10: DBCV SCREENSHOT

FIGURE 11: DBCV IMPLEMENTATION CASE

Encrypt Data

```
function encrypt(passeddata) {
    // Use ecies to encrypt data
    var pk = new eciesjs.PrivateKey()

const parsedData = Buffer.from(passeddata)
    const encryptedData = eciesjs.encrypt(pk.publicKey.toHex(), parsedData)

return {
        encryptedData: encryptedData,
        pk: pk
    }
}
```

1110

Decrypt Data

```
function decrypt(data, key) {
    return eciesjs.decrypt(key.toHex(), data).toString()
}
```

1120

FIGURE 12: DBCV SCREENSHOT
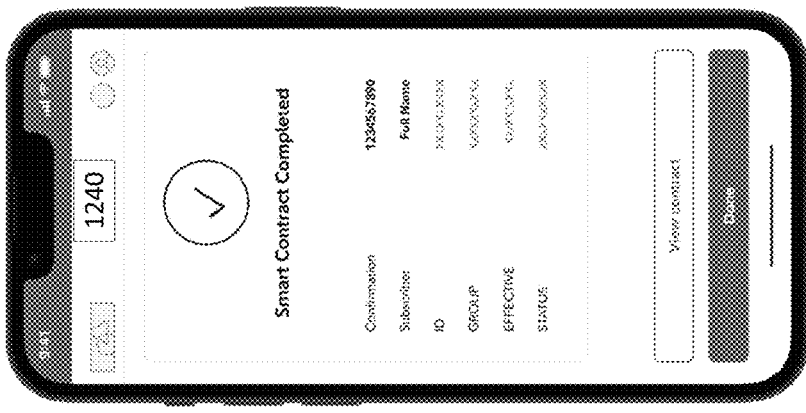
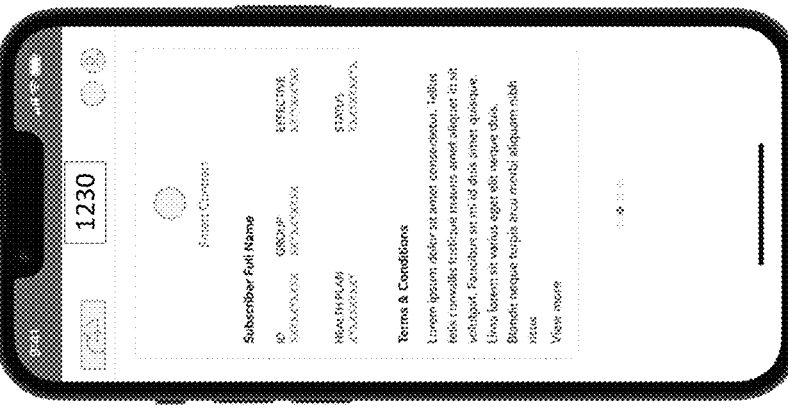
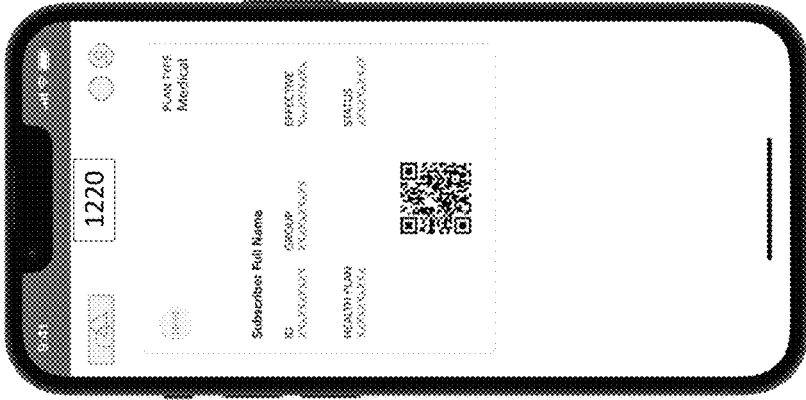
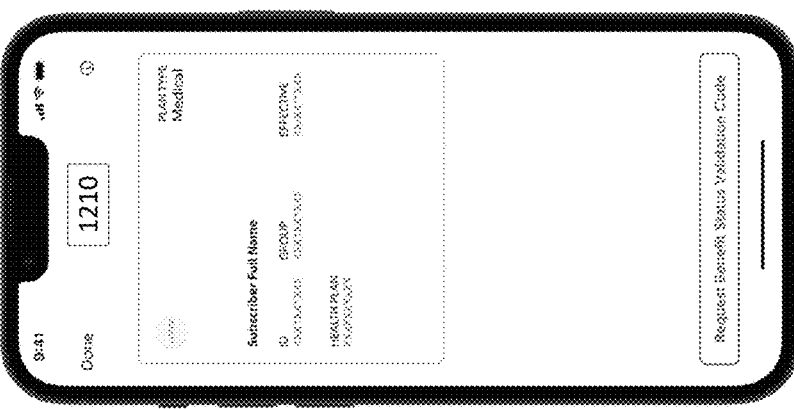

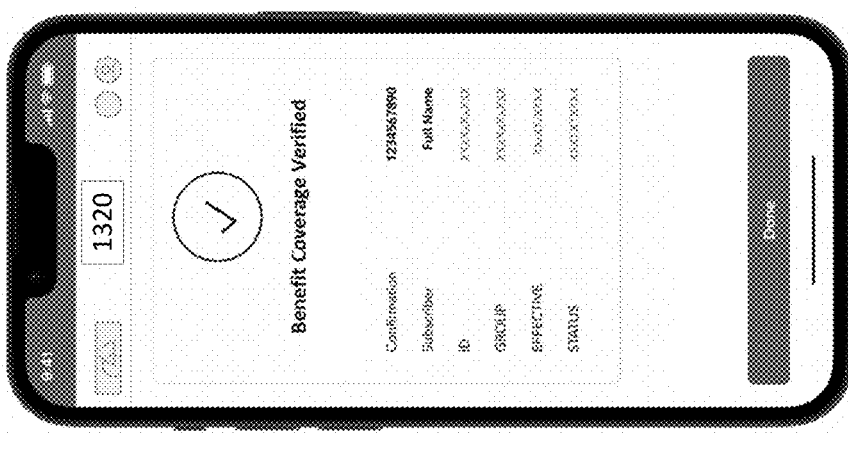
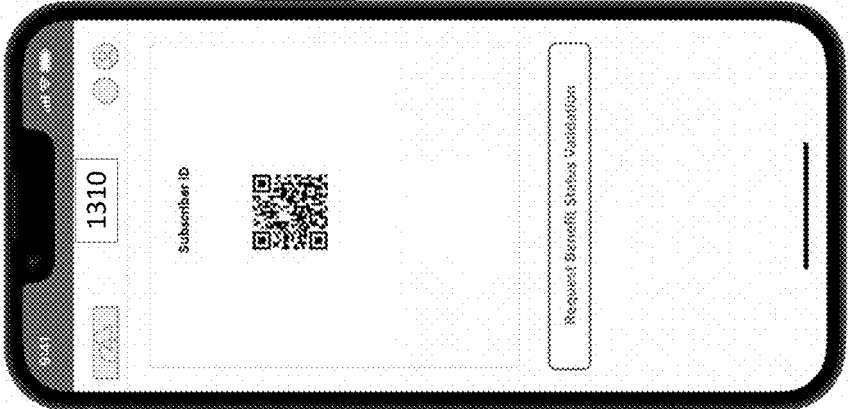
FIGURE 13: DBCV SCREENSHOT

FIGURE 14: DBCV IMPLEMENTATION CASE
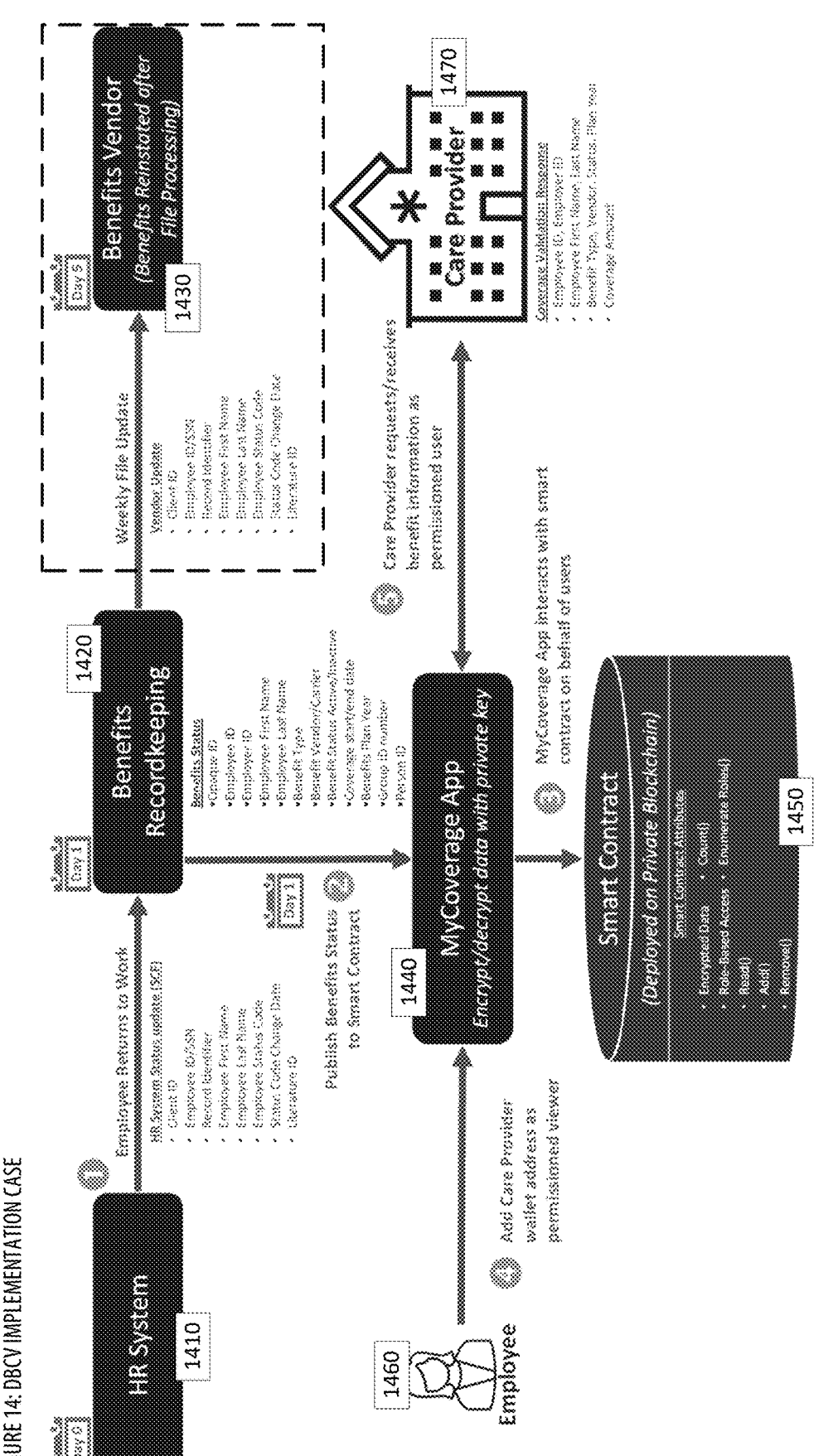

FIGURE 15: DBCV Controller
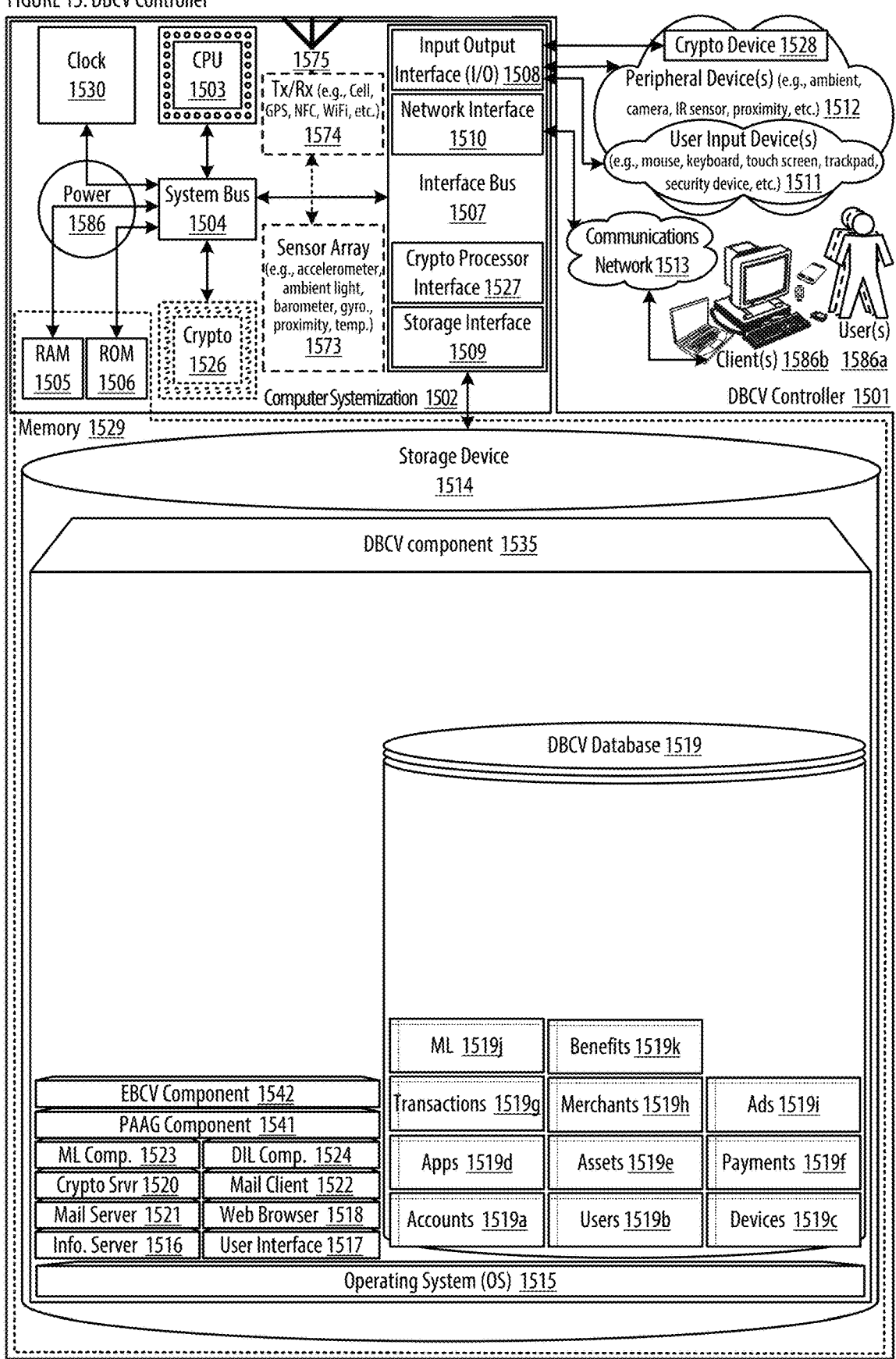

DISTRIBUTED BENEFITS COVERAGE VALIDATION APPARATUSES, PROCESSES AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology, and more particularly, include Distributed Benefits Coverage Validation Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Ethereum is an open source software application and a shared protocol. It allows users to anonymously and instantaneously transact Ether, a digital currency, without needing to trust counterparties or separate intermediaries. Ethereum achieves this trustless anonymous network using public/private key pairs, a popular encryption technique.

BRIEF DESCRIPTION OF THE DRAWINGS

Appendices and/or drawings illustrating various, non-limiting, example, innovative aspects of the Distributed Benefits Coverage Validation Apparatuses, Processes and Systems (hereinafter "DBCV") disclosure, include:

FIGS. 6A-B show non-limiting, example embodiments of a datagraph illustrating data flow(s) for the DBCV;

FIG. 7 shows non-limiting, example embodiments of a logic flow illustrating a provider access authorization granting (PAAG) component for the DBCV;

FIG. 8 shows non-limiting, example embodiments of a logic flow illustrating an employee benefit coverage validating (EBCV) component for the DBCV;

FIG. 9 shows non-limiting, example embodiments of implementation case(s) for the DBCV;

FIG. 10 shows non-limiting, example embodiments of a screenshot illustrating user interface(s) of the DBCV;

FIG. 11 shows non-limiting, example embodiments of implementation case(s) for the DBCV;

FIG. 12 shows non-limiting, example embodiments of a screenshot illustrating user interface(s) of the DBCV;

FIG. 13 shows non-limiting, example embodiments of a screenshot illustrating user interface(s) of the DBCV;

FIG. 14 shows non-limiting, example embodiments of implementation case(s) for the DBCV;

FIG. 15 shows a block diagram illustrating non-limiting, example embodiments of a DBCV controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Distributed Benefits Coverage Validation Apparatuses, Processes and Systems (hereinafter "DBCV") transforms provider info, add provider transaction request, employee subscriber ID card data datastructure/inputs, via DBCV components (e.g., PAAG, EBCV, etc. components), into add provider transaction response, benefit coverage validation notification outputs. The DBCV components, in various embodiments, implement advantageous features as set forth below.

Introduction

The DBCV provides unconventional features (e.g., machine to machine synchronization of benefits status via a smart contract that facilitates benefits coverage status validation) that were never before available in information technology.

In one embodiment, the DBCV allows individuals to provide proof of benefits coverage at the time of service. Today, individuals may be denied coverage or be required to pay for service if they cannot prove coverage is in force due to a delay between coverage status being shared between an employer and a benefits vendor. The DBCV may facilitate a better customer experience with health and/or other benefit participants who can have coverage validated at the point of service.

In one embodiment, benefits users can verify active coverage and receive services prior to the benefits provider system being updated with the coverage status, facilitating frictionless interaction with receiving service, as benefit status and coverages may be verified at the point of services. In various implementations, the DBCV may provide the following features:

Machine to Machine synchronization of benefits status

MyCoverage App with Two Factor Authentication

In one embodiment, the DBCV solves for a widespread problem with insurances and benefits in the US by shifting the proof of coverage from the insurance company to the benefits recordkeeper, which has more timely data. The proof of coverage is updated to blockchain storage and available for validation by a service provider via an individual's authorization (e.g., using a mobile app).

DBCV

Figure 1:
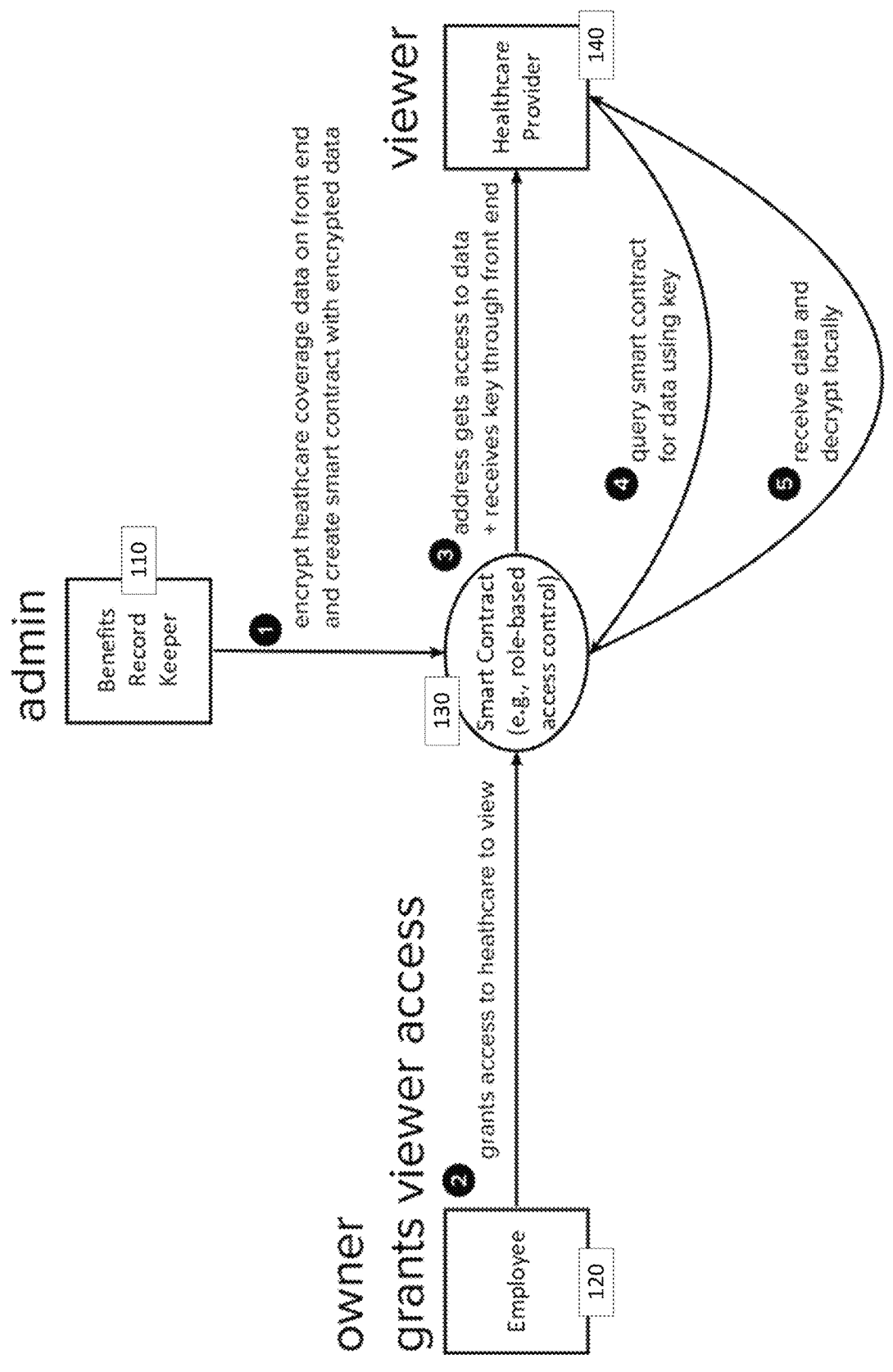
FIG. 1 shows non-limiting, example embodiments of an architecture for the DBCV.

FIG. 1 shows non-limiting, example embodiments of an architecture for the DBCV. In FIG. 1, an embodiment of how smart contracts may be utilized to facilitate benefit (e.g., healthcare) coverage validation is illustrated. An administrator, such as a benefits recordkeeper 110, may encrypt healthcare coverage data for an owner, such as an employee 120, and may create a smart contract 130 (e.g., with role-based access control) with the encrypted data. The employee may grant access to view the healthcare coverage data to a viewer, such as a healthcare provider 140. In one implementation, a blockchain address associated with the healthcare provider may be granted access to the encrypted data and/or to an encryption key that may be utilized to decrypt the encrypted data. The healthcare provider may query the smart contract to obtain the encrypted data and/or may query a key management system to retrieve the encryption key. The healthcare provider may decrypt the encrypted data using the encryption key and may evaluate the decrypted data to validate benefit coverage.

Figure 2:
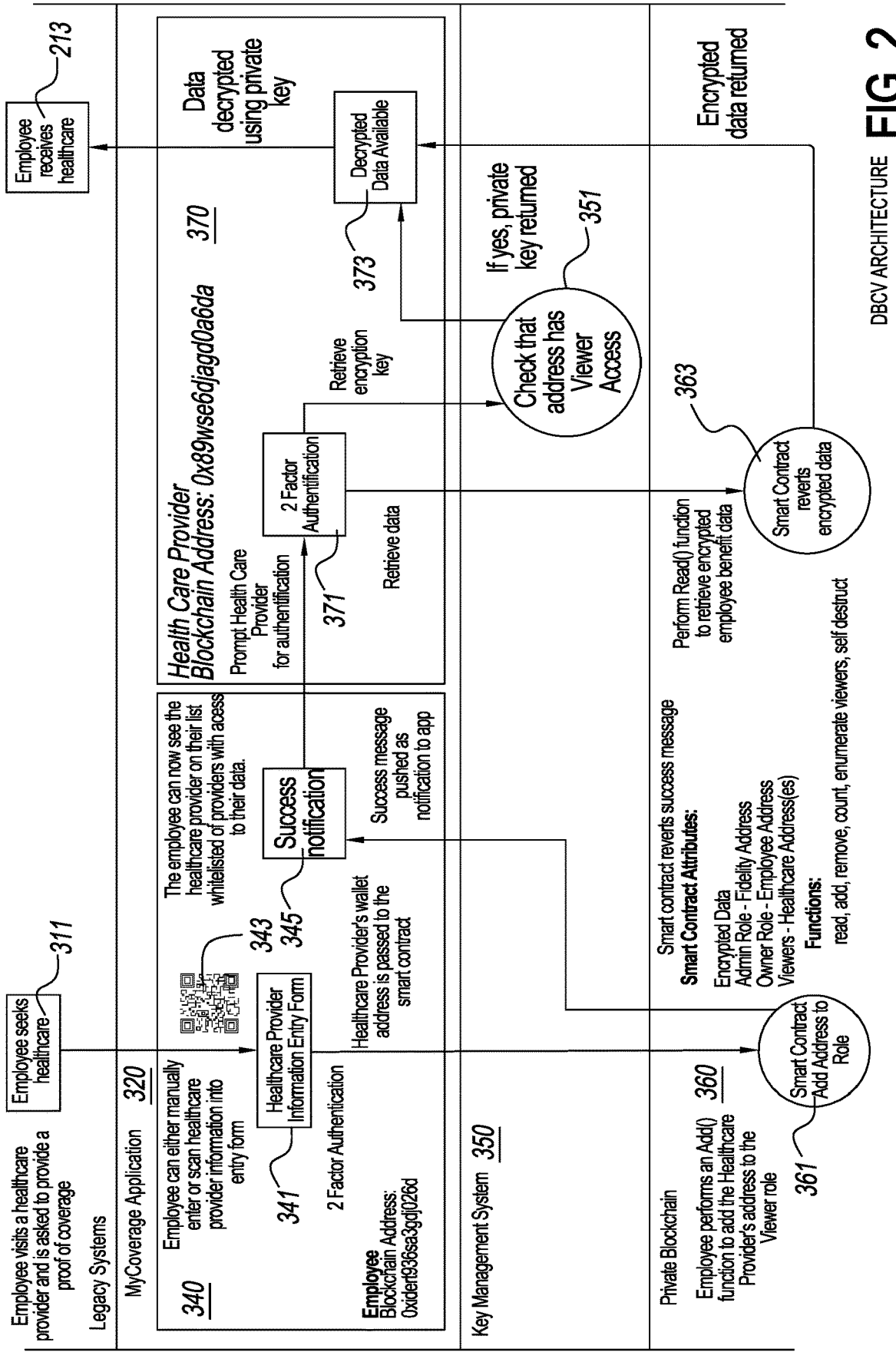
FIG. 2 shows non-limiting, example embodiments of an architecture for the DBCV.

FIG. 2 shows non-limiting, example embodiments of an architecture for the DBCV. In FIG. 2, an embodiment of how a benefits recordkeeper may publish benefit coverage data to a blockchain is illustrated. When an employee's benefit coverage should be reinstated (e.g., after returning from a leave of absence), a human resources (HR) system 211 of an employer may update a benefits recordkeeper 213 that the employee has returned to work. The benefits recordkeeper may utilize a benefits recordkeeper module 230 of a DBCV app 220 (the DBCV app is also referred to as MyCoverage Application or MyCoverage App throughout this disclosure) to input healthcare coverage data associated with the employee via a healthcare data entry form 231. For example, healthcare coverage data similar to the following may be obtained via the healthcare data entry form:

| | | | |
|---|---|---|---|
| 1. | Element | 2. | Example |
| 3. | Opaque ID | 4. | Unique record level identifier |
| 5. | Employee ID | 6. | Employee's unique identifier |
| 7. | Employer ID | 8. | Employer's unique identifier |
| 9. | Employee First Name | 10. | Jane |
| 11. | Employee Last Name | 12. | Smith |
| 13. | Benefit Type | 14. | Health / Dental / Vision |
| 15. | Benefit Vendor/Carrier | 16. | Cigna |
| 17. | Group ID | 18. | Vendor Specific Identifier |
| 19. | Member ID | 20. | Employee Specific |
| 21. | Coverage Tier | 22. | Individual/Family |
| 23. | Benefits Status | 24. | Active/Inactive |
| 25. | Benefits Plan Year | 26. | 2023 |

The healthcare coverage data may be pushed to a key management system 250, which may encrypt the healthcare coverage data using a private key at 251. A smart contract containing the encrypted benefit coverage data may be deployed at 261 on a private blockchain 260. The benefits recordkeeper module may obtain a completion notification 233, which may include a private key and/or a smart contract address of the deployed smart contract. The employee may utilize an employee module 240 of the DBCV app 220 to create a subscriber account at 241. The smart contract address may be utilized to create an employee subscriber ID card for the employee and a notification of healthcare benefit coverage may be provided via the employee module at 243.

Figure 3:
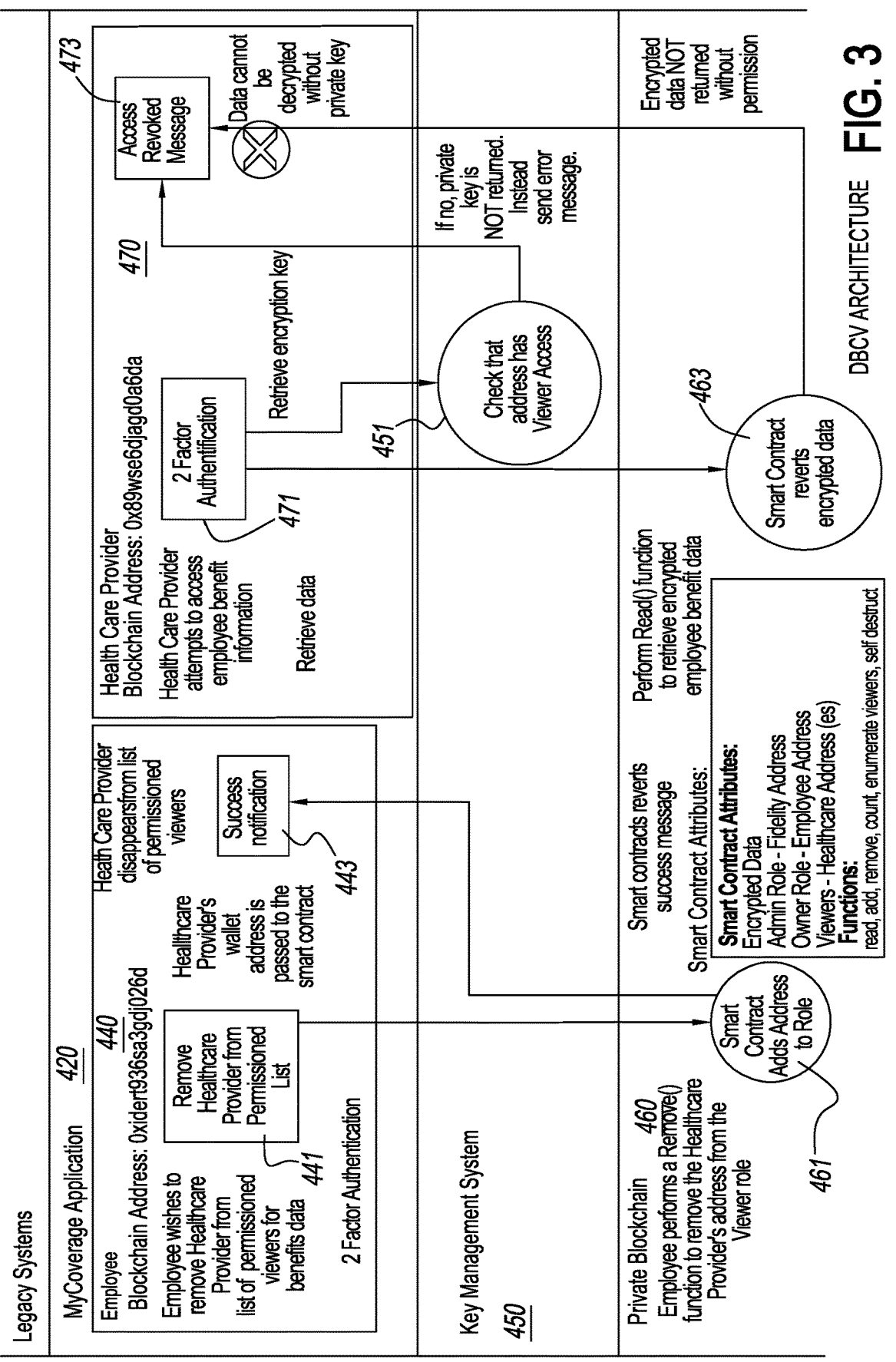
FIG. 3 shows non-limiting, example embodiments of an architecture for the DBCV.

FIG. 3 shows non-limiting, example embodiments of an architecture for the DBCV. In FIG. 3, an embodiment of how the employee's healthcare benefit coverage may be validated via the smart contract is illustrated. When the employee visits a healthcare provider and seeks healthcare, the employee may be asked to provide proof of benefit (e.g., healthcare) coverage at 311. The employee may utilize the employee module 340 of the DBCV app 320 to input healthcare provider information (e.g., including the provider's blockchain address) via a healthcare provider information entry form 341. In one implementation, the employee may enter the healthcare provider information into the entry form. In another implementation, the employee may scan the healthcare provider information into the entry form, such as via a barcode (e.g., QR code) 343. Alternatively, the healthcare provider information may be obtained via a message (e.g., an NFC message, a Bluetooth message, a WiFi message). The employee module may send a transaction to the smart contract on a (e.g., private, public) blockchain 360 to call an add function of the smart contract to add the healthcare provider's blockchain address (e.g., a wallet address) to the viewer role at 361. For example, the employee module may authenticate the transaction via two-factor authentication (2FA) and pass the provider's blockchain address as a function parameter, and the smart contract may add the provider's blockchain address to a whitelist of permissioned viewers. Upon successful execution of an add function, a success message may be pushed as a success notification 345 via the employee module.

The healthcare provider may utilize a healthcare provider module 370 of the DBCV app 320 to validate the employee's healthcare benefit coverage. In one embodiment, the healthcare provider may obtain employee subscriber ID card data at 371 (e.g., including the smart contract address and/or an identifier of the employee (e.g., an employee blockchain address, an employee subscriber identifier) and/or an identifier of the benefit (e.g., outpatient care, vision, dental)). In one implementation, the healthcare provider may manually enter the employee subscriber ID card data. In another implementation, the healthcare provider module may obtain the employee subscriber ID card data from the employee module (e.g., via a message (e.g., an NFC message, a Bluetooth message, a WiFi message), via scanning a barcode (e.g., a QR code) generated by the employee module). The healthcare provider module may send a call to a read function of the smart contract to retrieve the encrypted benefit coverage data of the employee at 363. For example, the healthcare provider module may authenticate the call via 2FA and may pass the identifier of the employee and/or the identifier of the benefit as function parameters, and the smart contract may return the encrypted benefit coverage data upon verifying that the healthcare provider's blockchain address has viewer access (e.g., the healthcare provider's blockchain address is on the whitelist for the viewer role). The healthcare provider module may send a call to the key management system 350 to retrieve the encryption key at 351. For example, the healthcare provider module may authenticate the call via 2FA (e.g., via an initial 2FA as discussed with regard to 371), and the key management system may verify that the healthcare provider's blockchain address has viewer access (e.g., via a query to the smart contract, via a query to an internal database) prior to returning a private key. The healthcare provider module may decrypt the encrypted benefit coverage data using the private key and may validate the employee's benefit coverage at 373. Upon validation of benefit coverage, the benefit (e.g., healthcare services) may be provided at 313.

Figure 4:
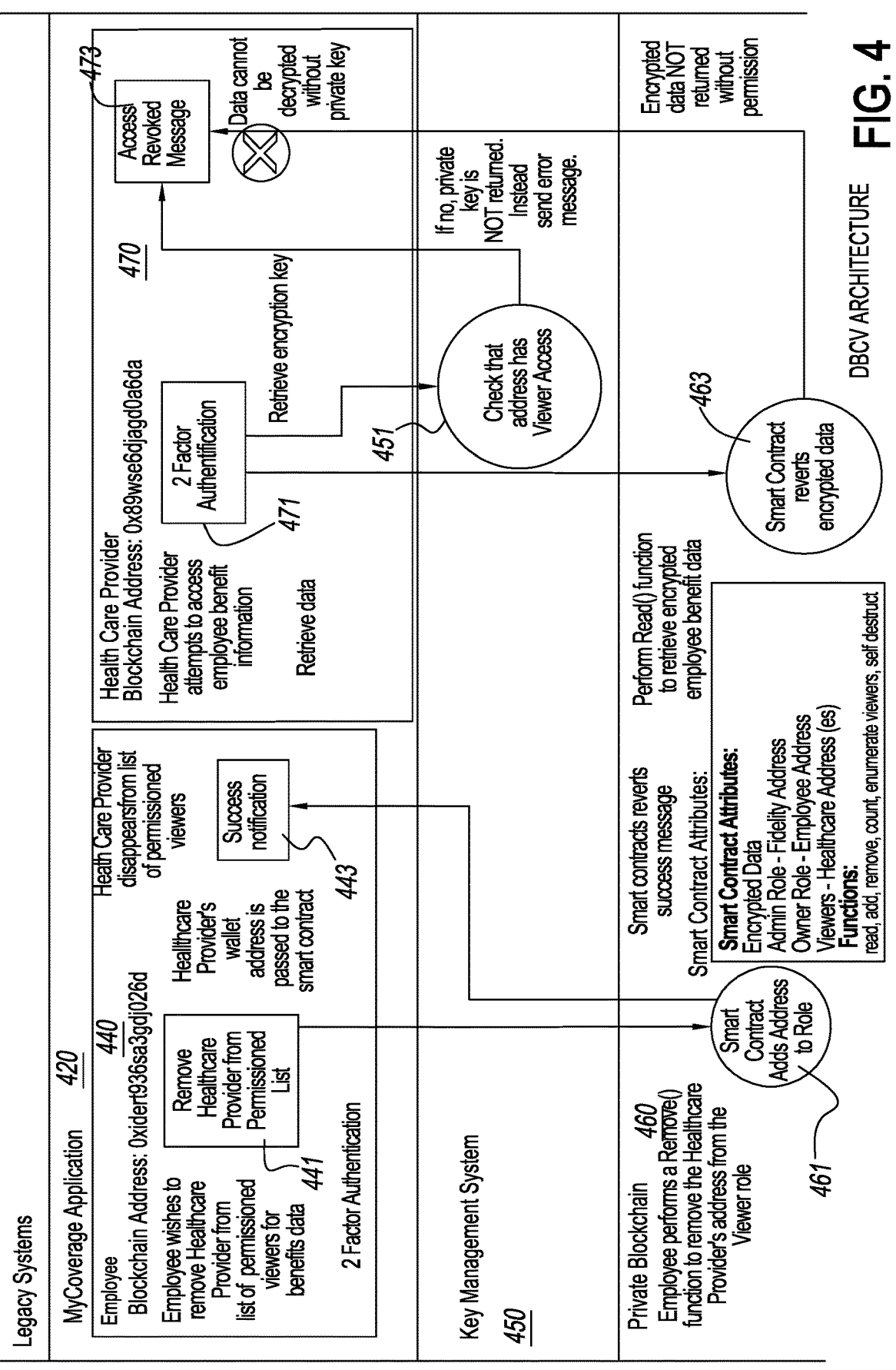
FIG. 4 shows non-limiting, example embodiments of an architecture for the DBCV.

FIG. 4 shows non-limiting, example embodiments of an architecture for the DBCV. In FIG. 4, an embodiment of how the employee may remove the healthcare provider's viewer access to the employee's benefit coverage data is illustrated. The employee may utilize the employee module 440 of the DBCV app 420 to select the healthcare provider whose viewer access should be revoked (e.g., from a list of providers that have viewer access) at 441. The employee module may send a transaction to the smart contract on a (e.g., private, public) blockchain 460 to call a remove function of the smart contract to remove the healthcare provider's blockchain address (e.g., a wallet address) from the viewer role at 461. For example, the employee module may authenticate the transaction via 2FA and pass the provider's blockchain address as a function parameter, and the smart contract may remove the provider's blockchain address from the whitelist of permissioned viewers. Upon successful execution of a remove function, a success message may be pushed as a success notification 443 via the employee module.

If the healthcare provider utilizes the healthcare provider module 470 of the DBCV app 420 to try to access the employee's healthcare benefit coverage data, the healthcare provider may try to utilize the employee subscriber ID card data (e.g., previously obtained from the employee) at 471. The healthcare provider module may call a read function of the smart contract to try to retrieve the encrypted benefit coverage data of the employee at 463. For example, the healthcare provider module may authenticate the call via 2FA and may pass the identifier of the employee and/or the identifier of the benefit as function parameters. The smart contract may deny returning the encrypted benefit coverage data upon determining that the healthcare provider's blockchain address does not have viewer access (e.g., the healthcare provider's blockchain address is not on the whitelist for the viewer role).

The healthcare provider module may send a call to the key management system 450 to retrieve the encryption key at 451. For example, the healthcare provider module may authenticate the call via 2FA (e.g., via an initial 2FA as discussed with regard to 471). The key management system may determine that the healthcare provider's blockchain address does not have viewer access (e.g., via a query to the smart contract, via a query to the internal database) and may deny returning the private key (e.g., sending an error message instead). The healthcare provider module may display an access revoked message at 473 to inform the healthcare provider that access to the employee's healthcare benefit coverage data was revoked.

Figure 5:
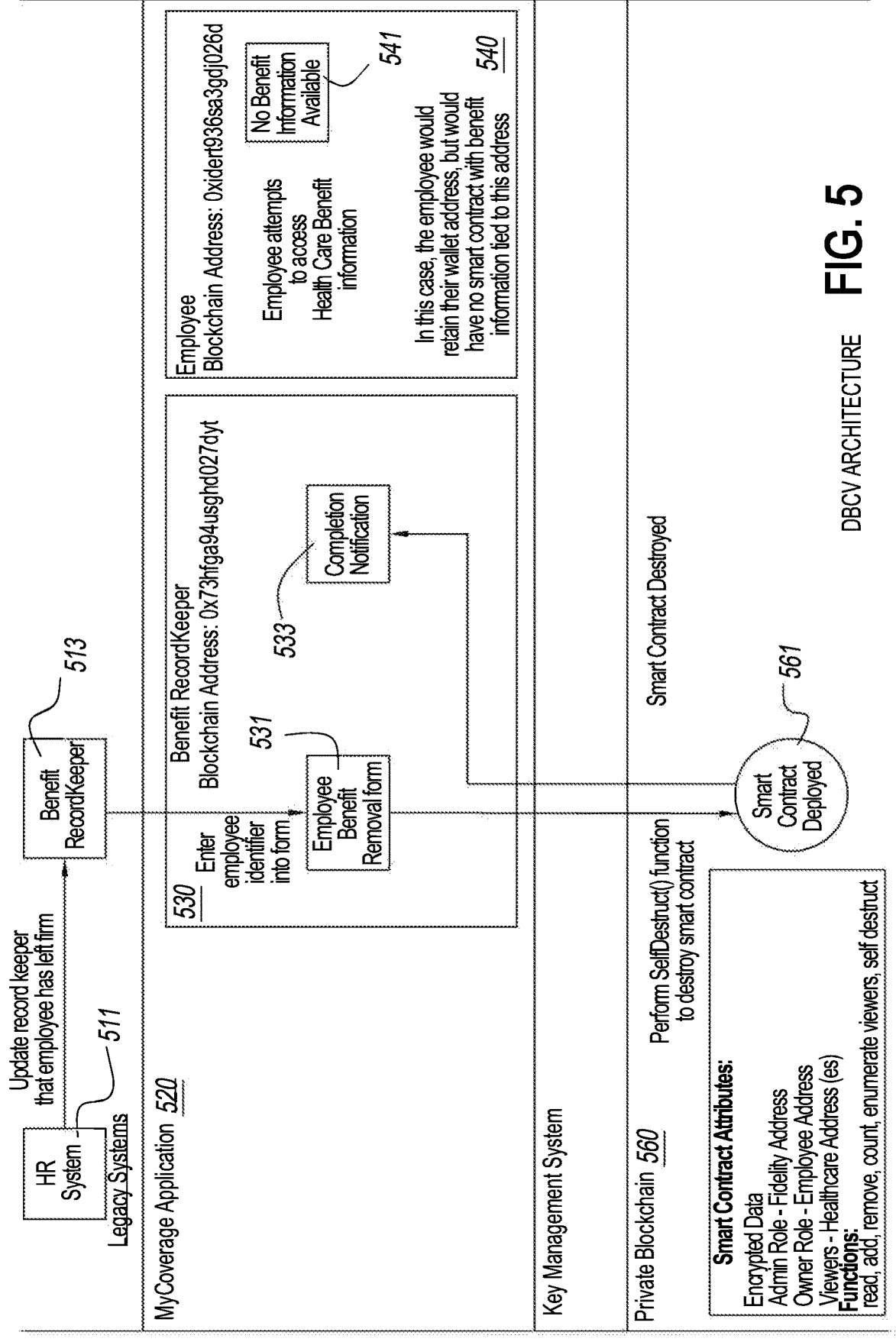
FIG. 5 shows non-limiting, example embodiments of an architecture for the DBCV.

FIG. 5 shows non-limiting, example embodiments of an architecture for the DBCV. In FIG. 5, an embodiment of how the benefits recordkeeper may remove benefit coverage data from the blockchain is illustrated. When an employee's benefit coverage should be removed (e.g., when the employee leaves the employer), the HR system 511 of the employer may update the benefits recordkeeper 513 that the employee has left the firm. The benefits recordkeeper may utilize the benefits recordkeeper module 530 of the DBCV app 520 to input an employee identifier associated with the employee via an employee benefit removal form 531. In one implementation, the benefits recordkeeper module may send a transaction to the smart contract on the private blockchain 560 to call a SelfDestruct function of the smart contract to destroy the smart contract at 561. In another implementation, the benefits recordkeeper module may send a transaction to the smart contract on the private blockchain 560 to make an upgradable call to update the status of the smart contract between active and inactive (e.g., to update the status of the smart contract to inactive). Upon successful execution of a SelfDestruct function or of an update the status function, a completion notification 533 may be provided via the benefits recordkeeper module.

If the employee utilize the employee module 540 of the DBCV app 520 to try to access the employee's healthcare benefit coverage data at 541, no benefit coverage data would be available as there would be no valid smart contract with benefit coverage data tied to the employee's blockchain address.

FIGS. 6A-B show non-limiting, example embodiments of a datagraph illustrating data flow(s) for the DBCV. In FIGS. 6A-B, dashed lines indicate data flow elements that may be more likely to be optional. In some implementations, a barcode medium 602 (e.g., a QR code printed on paper or displayed on a screen) that encodes provider info 621 may be scanned (e.g., via a camera) by an employee client 604 (e.g., of an employee user) to obtain provider information of a provider that should be granted viewer role authorization to the employee's benefit coverage data. Alternatively, the provider's information may be obtained via a message (e.g., an NFC message, a Bluetooth message, a WiFi message). For example, the employee client may be a desktop, a laptop, a tablet, a smartphone, a smartwatch, and/or the like that is executing a DBCV app employee module. In one implementation, the provider info may include data such as the provider's name, the provider's type (e.g., outpatient care healthcare provider, vision healthcare provider, dental healthcare provider), the provider's blockchain address, and/or the like.

A provider access authorization granting (PAAG) component 625 may utilize data provided in the provider info to grant the provider viewer role authorization to the employee's benefit coverage data. See FIG. 7 for additional details regarding the PAAG component.

The employee client 604 may send an add provider transaction request 629 to the employee's smart contract (e.g., containing the employee's encrypted benefit coverage data) deployed on a blockchain 608 (e.g., a new private blockchain, an existing public blockchain such as Ethereum) to facilitate adding the provider's blockchain address to a whitelist of permissioned viewers. In one implementation, the add provider transaction request may include data such as a request identifier, a smart contract address of the employee's smart contract, function call details (e.g., such as the provider's blockchain address and a transaction signature of the employee), and/or the like. In one embodiment, the employee client may provide the following example add provider transaction request, substantially in the form of a (Secure) Hypertext Transfer Protocol ("HTTP(S)") POST message including extensible Markup Language ("XML") formatted data, as provided below:

```
POST /add_provider_transaction_request.php HTTP/1.1
Host: www.server.com
Content-Type: Application/XML
Content-Length: 667
<?XML version = "1.0" encoding = "UTF-8"?>
<add_provider_transaction_request>
    <request_identifier>ID_request_2</request_identifier>
    <smart_contract_address>
        address of the employee's smart contract
    </smart_contract_address>
    <function_call_details>
        <function_name>add</function_name>
        <provider_address>
            0x89wse6djagd0a6da
        </provider_address>
        <transaction_signature>
            signature of the employee
        </transaction_signature>
    </function_call_details>
</add_provider_transaction_request>
```

7

The employee's smart contract deployed on the blockchain 608 may send an add provider transaction response 633 to the employee client 604 to confirm that the transaction was processed. In one implementation, the add provider transaction response may include data such as a response identifier, a status, and/or the like. In one embodiment, the employee's smart contract deployed on the blockchain may provide the following example add provider transaction response, substantially in the form of a HTTP(S) POST message including XML-formatted data, as provided below:

```
POST /add_provider_transaction_response.php HTTP/1.1
Host: www.server.com
Content-Type: Application/XML
Content-Length: 667
<?XML version = "1.0" encoding = "UTF-8"?>
<add_provider_transaction_response>
    <response_identifier>ID_response_2</response_identifier>
    <status>OK</status>
</add_provider_transaction_response>
```

In some implementations, the employee client 604 may send employee subscriber ID card data 637 to a provider client 606 (e.g., of a provider user) to facilitate validating the employee's benefit coverage. For example, the provider client may be a desktop, a laptop, a tablet, a smartphone, a smartwatch, and/or the like that is executing a DBCV app (e.g., healthcare) provider module. In one implementation, the employee subscriber ID card data may include data such as a blockchain address of the employee's smart contract, the employee's blockchain address, the employee's subscriber identifier, the employee's name, a benefit identifier, and/or the like.

An employee benefit coverage validating (EBCV) component 641 may utilize data provided in the employee subscriber ID card data to validate the employee's benefit coverage. See FIG. 8 for additional details regarding the EBCV component.

The provider client 606 may send a benefit coverage data request 645 to the employee's smart contract deployed on the blockchain 608 to facilitate retrieving the encrypted benefit coverage data of the employee. In one implementation, the benefit coverage data request may include data such as a request identifier, a smart contract address of the employee's smart contract, function call details (e.g., such as the employee's blockchain address and a transaction signature of the provider), and/or the like. In one embodiment, the provider client may provide the following example benefit coverage data request, substantially in the form of a HTTP (S) POST message including XML-formatted data, as provided below:

8

```
POST /benefit_coverage_data_request.php HTTP/1.1
Host: www.server.com
Content-Type: Application/XML
Content-Length: 667
<?XML version = "1.0" encoding = "UTF-8"?>
<benefit_coverage_data_request>
    <request_identifier>ID_request_4</request_identifier>
    <smart_contract_address>
        address of the employee's smart contract
    </smart_contract_address>
    <function_call_details>
        <function_name>read</function_name>
        <employee_address>
            0xidert936sa3gdj026d
        </employee_address>
        <transaction_signature>
            signature of the provider
        </transaction_signature>
    </function_call_details>
</benefit_coverage_data_request>
```

The employee's smart contract deployed on the blockchain 608 may send a benefit coverage data response 649 to the provider client 606 with the requested encrypted benefit coverage data of the employee. In one implementation, the benefit coverage data response may include data such as a response identifier, the requested encrypted benefit coverage data of the employee, and/or the like. In one embodiment, the employee's smart contract deployed on the blockchain may provide the following example benefit coverage data response, substantially in the form of a HTTP(S) POST message including XML-formatted data, as provided below:

```
POST /benefit_coverage_data_response.php HTTP/1.1
Host: www.server.com
Content-Type: Application/XML
Content-Length: 667
<?XML version = "1.0" encoding = "UTF-8"?>
<benefit_coverage_data_response>
    <response_identifier>ID_response_4</response_identifier>
    <data>encrypted benefit coverage data of the employee</data>
</benefit_coverage_data_response>
```

The provider client 606 may send a benefit coverage data encryption key request 653 to a key management server 610 to facilitate retrieving an encryption key corresponding to the encrypted benefit coverage data of the employee. In one implementation, the benefit coverage data encryption key request may include data such as a request identifier, a provider identifier, the employee's blockchain address, and/or the like. In one embodiment, the provider client may provide the following example benefit coverage data encryption key request, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
```

-continued

```
JohnDoeDaDoeDoe@gmail.com/mycertifcate.dc</digital_cert_link>
        //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages may include only one to save
        //space
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>DBCV.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <benefit_coverage_data_encryption_key_request>
      <request_identifier>ID_request_5</request_identifier>
      <provider_identifier>identifier of the provider</provider_identifier>
      <employee_address>
        0xidert936sa3gdj026d
      </employee_address>
    </benefit_coverage_data_encryption_key_request>
</auth_request>
```

The key management server 610 may send a benefit coverage data encryption key response 657 to the provider client 606 with the requested encryption key. In one embodiment, the provider client may utilize the encryption key to decrypt the encrypted benefit coverage data and may validate the employee's benefit coverage using the decrypted benefit coverage data. In one implementation, the benefit coverage data encryption key response may include data such as a response identifier, the requested encryption key, and/or the like. In one embodiment, the key management server may provide the following example benefit coverage data encryption key response, substantially in the form of a HTTP(S) POST message including XML-formatted data, as provided below:

```
POST /benefit_coverage_data_encryption_key_response.php HTTP/1.1
Host: www.server.com
Content-Type: Application/XML
Content-Length: 667
<?XML version = "1.0" encoding = "UTF-8"?>
<benefit_coverage_data_encryption_key_response>
    <response_identifier>ID_response_5</response_identifier>
    <encryption_key>
      encryption key corresponding to the encrypted benefit coverage data
    </encryption_key>
</benefit_coverage_data_encryption_key_response>
```

FIG. 7 shows non-limiting, example embodiments of a logic flow illustrating a provider access authorization granting (PAAG) component for the DBCV. In FIG. 7, a provider authorization grant request may be obtained at 701. For example, the provider authorization grant request may be obtained as a result of a request from an employee user to grant a provider (e.g., a healthcare provider) viewer role authorization to the employee's benefit (e.g., healthcare) coverage data. In one implementation, the employee may enter the provider's provider information (e.g., into an entry form of the DBCV app employee module). In another implementation, the employee may scan the provider's provider information via a barcode medium (e.g., a QR code printed on paper or displayed on a screen). Alternatively, the provider's information may be obtained via a message (e.g., an NFC message, a Bluetooth message, a WiFi message), such as from the provider's client or from another device.

The employee's authorization for the provider authorization grant request may be verified at 705. In one implementation, 2FA (e.g., a password and a synchronized random code) may be utilized to verify the employee's authorization for the provider authorization grant request.

A determination may be made at 709 whether the employee's authorization for the provider authorization grant request was verified successfully. If the request is not authorized, an authorization grant failure notification may be provided at 713. In one implementation, a notification indicating an authorization grant failure may be displayed to the employee via the DBCV app employee module.

If the request is authorized, a blockchain address of a smart contract associated with the employee may be determined at 717. In one implementation, the blockchain address of the smart contract associated with the employee may be determined based on the employee's identifier (e.g., specified as part of the employee's authorization for the provider authorization grant request). For example, the blockchain address of the associated smart contract may be determined via a MySQL database command similar to the following:

```
SELECT employeeSmartContractBlockchainAddress
FROM Benefits
WHERE employeeID = identifier of the employee;
```

A blockchain address associated with the provider may be determined at 721. In one embodiment, the provider's provider information may specify the provider's blockchain address. In one implementation, data entered into the entry form of the DBCV app employee module may be parsed (e.g., using PHP commands) to determine the provider's blockchain address. In another implementation, data scanned via the barcode medium may be decoded and/or parsed (e.g., using PHP commands) to determine the provider's blockchain address.

A transaction to add the provider's blockchain address to a whitelist of permissioned viewers may be submitted to the smart contract associated with the employee at 725. In one implementation, an add provider transaction request may be submitted to the smart contract. For example, the provider may be granted viewer role authorization to the employee's benefit coverage data via a call to an add function of the smart contract (e.g., signed with a private key associated with the employee's blockchain address). See FIG. 9 for an example of an add function (e.g., AddRecord function 910) of the smart contract.

A determination may be made at 729 whether the transaction to grant the provider viewer role authorization was successful. If the transaction was not successful, an authorization grant failure notification may be provided at 713. In one implementation, a notification indicating an authorization grant failure may be displayed to the employee via the DBCV app employee module.

If the transaction was successful, an authorization grant success notification may be provided at 733. In one implementation, a notification indicating an authorization grant success may be displayed to the employee via the DBCV app employee module. In some implementations, the provider (e.g., the provider's name and/or blockchain address) may be added to the list of whitelisted providers that may be displayed to the employee via the DBCV app employee module.

A determination may be made at 737 whether to notify the provider's client that the provider was granted viewer role authorization to the employee's benefit coverage data and/or to provide employee subscriber ID card data associated with the employee to the provider's client. If so, a success message may be generated and the provider's name and/or smart contract address may appear on a list of those authorized with the viewer role. The employee subscriber ID card data may be provided to the provider's client at 741. In various implementations, the employee subscriber ID card data may be provided via a message (e.g., an NFC message, a Bluetooth message, a WiFi message), via a barcode (e.g., a QR code) generated on the screen of the employee's client, and/or the like. In some implementations, the employee subscriber ID card data may be provided indirectly via an authorization code that may be utilized to retrieve the employee subscriber ID card data from a DBCV database.

FIG. 8 shows non-limiting, example embodiments of a logic flow illustrating an employee benefit coverage validating (EBCV) component for the DBCV. In FIG. 8, a benefit coverage validation request may be obtained at 801. For example, the benefit coverage validation request may be obtained as a result of a request from a provider (e.g., a healthcare provider) to validate benefit coverage of an employee of an employer providing a benefit (e.g., healthcare insurance). In one implementation, the benefit coverage validation request may be obtained when the provider enters employee subscriber ID card data associated with the employee (e.g., into an entry form of the DBCV app (e.g., healthcare) provider module). In another implementation, the benefit coverage validation request may be obtained when the provider's client obtains employee subscriber ID card data associated with the employee from the employee's client.

The provider's authorization for the benefit coverage validation request may be verified at 805. In one implementation, 2FA (e.g., a password and a synchronized random code) may be utilized to verify the provider's authorization for the benefit coverage validation request.

A determination may be made at 809 whether the provider's authorization for the benefit coverage validation request was verified successfully. If the request is not authorized, a benefit coverage validation failure notification may be provided at 813. In one implementation, a notification indicating a benefit coverage validation failure may be displayed to the provider via the DBCV app provider module.

If the request is authorized, employee subscriber ID card data associated with the employee may be obtained at 817. In one implementation, data entered into the entry form of the DBCV app provider module may be parsed (e.g., using PHP commands) to determine the employee subscriber ID card data associated with the employee. In another implementation, data obtained (e.g., received in a message, scanned via a barcode medium) from the employee's client may be decoded and/or used to query a database (e.g., via an authorization code) and/or parsed (e.g., using PHP commands) to determine the employee subscriber ID card data associated with the employee.

A blockchain address of a smart contract associated with the employee may be determined at 821. In one implementation, the blockchain address of the smart contract associated with the employee may be specified as part of the employee subscriber ID card data associated with the employee. In another implementation, the blockchain address of the smart contract associated with the employee may be determined based on the employee's identifier (e.g., specified as part of the employee subscriber ID card data associated with the employee). For example, the blockchain address of the associated smart contract may be determined via a MySQL database command similar to the following:

```
SELECT employeeSmartContractBlockchainAddress
FROM Benefits
WHERE employeeID = identifier of the employee;
```

In another example, the blockchain address of the associated smart contract may be determined from the blockchain.

A function call to read the employee's encrypted benefit coverage data may be submitted to the smart contract associated with the employee at 825. In one implementation, a benefit coverage data request may be submitted to the smart contract by the provider's client. In an alternative implementation, an intermediary server may be utilized by the provider's client (e.g., by providing an authorization code to the intermediary server via a web portal) to submit the benefit coverage data request to the smart contract on behalf of the provider's client. For example, the provider may obtain the employee's encrypted benefit coverage data via a call to a read function of the smart contract that reads data off the smart contract (e.g., signed with a private key associated with the provider's blockchain address). See FIG. 9 for an example of a read function (e.g., getCoverage function 920) of the smart contract.

A determination may be made at 829 whether a function call to read the employee's encrypted benefit coverage data was successful. If the function call was not successful, a benefit coverage validation failure notification may be provided at 813. In one implementation, a notification indicating a benefit coverage validation failure may be displayed to the provider via the DBCV app provider module.

If the function call was successful, a request to retrieve an encryption key corresponding to the encrypted benefit coverage data of the employee may be submitted to a key management server at 833. In one implementation, a benefit coverage data encryption key request may be sent to the key management server. For example, the key management server may determine the provider's blockchain address (e.g., based on the provider's identifier) and may return the encryption key corresponding to the encrypted benefit coverage data of the employee upon verifying that the provider's blockchain address has viewer access to the employee's benefit coverage data.

A determination may be made at 837 whether the encryption key was obtained successfully. If the encryption key was not obtained, a benefit coverage validation failure notification may be provided at 813. In one implementation, a notification indicating a benefit coverage validation failure may be displayed to the provider via the DBCV app provider module.

If the key (e.g., a private key in asymmetric key cryptography, a shared key in symmetric key cryptography) was obtained, the encrypted benefit coverage data of the employee may be decrypted with the key at 841. See FIG. 11 for an example of a function that may be utilized by the DBCV app provider module to decrypt the encrypted benefit coverage data of the employee (e.g., decrypt function 1120).

The decrypted benefit coverage data may be evaluated at 845. In one embodiment, the decrypted benefit coverage data may be evaluated to validate the benefit coverage of the employee. In one implementation, the decrypted benefit coverage data may be parsed (e.g., using PHP commands) to determine a benefit status (e.g., active or inactive) corresponding to the benefit (e.g., identified based on an employee subscriber identifier and/or a benefit identifier and/or a benefit type identifier and/or the like) to ascertain whether the benefit is covered (e.g., whether the benefit status is active).

A determination may be made at 849 whether the benefit coverage was validated successfully. If the benefit coverage was not validated successfully, a benefit coverage validation failure notification may be provided at 813. In one implementation, a notification indicating a benefit coverage validation failure may be displayed to the provider via the DBCV app provider module.

If the benefit coverage was validated successfully, a benefit coverage validation success notification may be provided at 853. In one implementation, a notification indicating a benefit coverage validation success may be displayed to the provider via the DBCV app provider module.

FIG. 9 shows non-limiting, example embodiments of implementation case(s) for the DBCV. In FIG. 9, exemplary code showing various functions of a smart contract that may be utilized to contain encrypted benefit coverage data is illustrated. In one embodiment, interaction with a blockchain may be done via the smart contact. In one implementation, smart contracts may be written and/or developed on the Ethereum network by making use of the Solidity programming language. Sample code 910 shows an exemplary addRecord function that may be utilized to upload records to the smart contract. Sample code 920 shows an exemplary read function (e.g., getCoverage function) that may be utilized to view information stored by a record, such as whether the user is indeed covered. Sample code 920 shows an exemplary viewWhiteList function that may be utilized to view information stored by the smart contract, such as whether a provider's blockchain address is on the whitelist for the viewer role.

FIG. 10 shows non-limiting, example embodiments of a screenshot illustrating user interface(s) of the DBCV. In FIG. 10, an exemplary user interface (e.g., for a mobile device, for a website) for interacting with the smart contract is illustrated. Screen 1010 shows that a user may utilize a getCoverage widget to find out (e.g., via the sample code 920) if a healthcare seeker (e.g., specified via a blockchain address "add") has coverage (e.g., whether the Boolean value is equal to true). Screen 1020 shows that the user may utilize an addToWhitelist widget to grant another user (e.g., specified via a blockchain address "add") the ability to access their records, which allows the other user to use the getCoverage widget.

FIG. 11 shows non-limiting, example embodiments of implementation case(s) for the DBCV. In FIG. 11, exemplary code showing various functions of the DBCV app is illustrated. Sample code 1110 shows an exemplary encrypt function that may be utilized to encrypt information before it is passed to the smart contract on the blockchain. Sample code 1120 shows an exemplary decrypt function that may be utilized to decrypt encrypted information obtained from the smart contract on the blockchain.

FIG. 12 shows non-limiting, example embodiments of a screenshot illustrating user interface(s) of the DBCV. In FIG. 12, an exemplary user interface (e.g., for a mobile device, for a website) that may be utilized by an employee user to grant a provider (e.g., a healthcare provider) viewer role authorization to the employee's benefit (e.g., healthcare) coverage data is illustrated. Screen 1210 shows that the employee may utilize a "Request Benefit Status Validation Code" widget to initiate generation of an authorization code for the provider. Screen 1220 shows that the employee may scan a QR code to obtain the provider's provider information. Alternatively, the provider's information may be obtained via a message (e.g., an NFC message, a Bluetooth message, a WiFi message). Screen 1230 shows that the employee may view terms and conditions associated with granting the provider viewer role authorization. Screen 1240 shows that the employee may be provided with the authorization code for the provider (e.g., an alphanumeric confirmation value).

FIG. 13 shows non-limiting, example embodiments of a screenshot illustrating user interface(s) of the DBCV. In FIG. 13, an exemplary user interface (e.g., for a mobile device, for a website) that may be utilized by the provider to validate benefit coverage of the employee is illustrated. Screen 1310 shows that the provider may utilize a "Request Benefit Status Validation" widget to initiate benefit coverage validation by scanning a QR code (e.g., generated by the employee's client) to obtain the employee subscriber ID card data (e.g., the employee's name and/or the authorization code) associated with the employee. Alternatively, the employee subscriber ID card data may be obtained via a message (e.g., an NFC message, a Bluetooth message, a WiFi message), such as from the employee's client or another device. Screen 1320 shows that the provider may be shown a benefit coverage validation success notification indicating that the employee's benefit coverage was verified.

FIG. 14 shows non-limiting, example embodiments of implementation case(s) for the DBCV. In FIG. 14, an exemplary implementation case of DBCV operation is illustrated. When an employee returns to work, an HIR system 1410 of an employer may update a benefits recordkeeper 1420 that the employee's benefits status is now active. The benefits recordkeeper may update a benefits vendor 1430 that the employee's benefits status is now active. It may take a long time for the benefits vendor to properly update the employee's benefits status (e.g., 5 days) due to the mechanism (e.g., a weekly file update) utilized by the benefits vendor to process benefits status updates, resulting in inconvenience or denial of services to the employee. Instead, the responsibility for benefits coverage validation may be shifted to the DBCV. The benefits recordkeeper may utilize a MyCoverage App 1440 to publish encrypted benefits status data to a smart contract 1450 deployed on a private blockchain. The employee 1460 may utilize the MyCoverage App to grant access to view the benefits status data to a care provider 1470. The care provider may utilize the MyCoverage App to request and/or receive the benefit status data as a permissioned user with viewer role authorization.

Additional Alternative Embodiment Examples

The following alternative example embodiments provide a number of variations of some of the already discussed principles for expanded color on the abilities of the DBCV.

Solves a widespread problem with insurance and benefits in the US by shifting the proof of coverage from the insurance company to the benefits recordkeeper which has more timely data on behalf of an employer/employee Due to lack of real-time connections, Insurance Companies and benefits vendors (e.g., Telemedicine) do not get notified or update the status of an individual's coverages in a timely manner, resulting in inconvenience or denial of services to individuals Benefits Recordkeeping Systems are updated regularly with employee status and coverage eligibility Pushing coverage status data in real-time to a Blockchain maintains current benefits coverage status well ahead of Benefits Carriers/Vendors whose status typically runs days to weeks behind.

Benefits users can verify active coverage for a Care Provider and receive services prior to the benefit carriers/vendors/insurance company's system being updated with the coverage status Frictionless interaction with receiving service, as benefit status and coverages may be verified at the point of services Ownership of benefits data and ability to control who has access Machine to Machine synchronization of benefits status Smart Contract to manage benefits status and access by vendor/providers MyCoverage App with secure access control and rights to grant access to providers (to view benefits coverage)

Individuals can validate their Benefit Coverage Status

Solves a pervasive problem for individuals whose coverage status is updated days to weeks after they return to coverage Process Flow: Receiving Care

| 27. Event | 28. Action |
|---|---|
| 29. 1. Employee Returns to Work | 30. Corporate HR System notifies Benefits Recordkeeper of Status Change |
| 31. 2. Benefits Recordkeeper shares Benefits Status | 32. Benefits status is encrypted and published to the blockchain via smart contract in near-real-time |
| | 33. Update sent to Benefits Vendor/Carrier by file interface |
| 34. 3. Employee Seeks Care | 35. Care Provider wishes to validate insurance benefit |
| 36. 4. Employee uses mobile app to add Care Provider to their list of approved viewers | 37. Care Provider address is added to the employee smart contract whitelist |
| 38. 5. Web Portal Benefits Status Validation | 39. Care Provider retrieves employee benefit data from smart contract and decrypts it locally |
| 40. 6. Employee receives care | 41. Care Provider confirms employee benefits status and provides care |

Additional embodiments may include:

1. A blockchain-based benefit coverage validation apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a benefit coverage validation request datastructure, in which the benefit coverage validation request datastructure is structured to specify subscriber ID card data associated with a beneficiary;

determine, via the at least one processor, a blockchain address of a smart contract associated with the beneficiary via the subscriber ID card data;

obtain, via the at least one processor, encrypted benefit coverage data associated with the beneficiary by sending a blockchain transaction to the blockchain address of the smart contract, in which the blockchain transaction is structured to include a transaction signature that proves control over a blockchain address associated with a provider, in which the blockchain address associated with the provider has viewer role authorization to the encrypted benefit coverage data;

obtain, via the at least one processor, an encryption key corresponding to the encrypted benefit coverage data from a key management server, in which the key management server is structured to verify that the provider has viewer role authorization to the encrypted benefit coverage data;

decrypt, via the at least one processor, the encrypted benefit coverage data associated with the beneficiary with the encryption key; and evaluate, via the at least one processor, the decrypted benefit coverage data associated with the beneficiary to determine a benefit status corresponding to a benefit provided by the provider.

2. The apparatus of embodiment 1, in which the subscriber ID card data is obtained via a wireless communication message from the beneficiary's client device.

3. The apparatus of embodiment 1, in which the subscriber ID card data is obtained via scanning a barcode displayed by the beneficiary's client device.

4. The apparatus of embodiment 1, in which the subscriber ID card data is structured to specify at least one of: the blockchain address of a smart contract associated with the beneficiary, a subscriber identifier associated with the beneficiary, an authorization code associated with a provider.

5. The apparatus of embodiment 1, in which the instructions to determine the blockchain address of the smart contract associated with the beneficiary via the subscriber ID card data are structured as instructions to:

parse, via the at least one processor, the benefit coverage validation request datastructure to determine the blockchain address of the smart contract.

6. The apparatus of embodiment 1, in which the instructions to determine the blockchain address of the smart contract associated with the beneficiary via the subscriber ID card data are structured as instructions to:

parse, via the at least one processor, the benefit coverage validation request datastructure to determine a subscriber identifier associated with the beneficiary; and query, via the at least one processor, a database to determine a blockchain address associated with the subscriber identifier.

7. The apparatus of embodiment 1, in which the instructions to determine the blockchain address of the smart contract associated with the beneficiary via the subscriber ID card data are structured as instructions to:

parse, via the at least one processor, the benefit coverage validation request datastructure to determine an authorization code associated with a provider; and query, via the at least one processor, a database to determine a blockchain address associated with the authorization code.

8. The apparatus of embodiment 1, in which the smart contract is deployed on a private blockchain.

9. The apparatus of embodiment 1, in which the smart contract is structured to comprise a whitelist of permissioned viewers that includes the blockchain address associated with the provider.

10. The apparatus of embodiment 1, in which the key management server is a database server.

11. The apparatus of embodiment 1, in which the key management server is structured to verify that the provider has viewer role authorization to the encrypted benefit coverage data by sending a query to the smart contract to verify that the blockchain address associated with the provider has viewer role authorization to the encrypted benefit coverage data.

12. The apparatus of embodiment 1, in which the key management server is structured to verify that the provider has viewer role authorization to the encrypted benefit coverage data by sending a query to an internal database to verify that an identifier associated with the provider has viewer role authorization to the encrypted benefit coverage data.

13. The apparatus of embodiment 1, in which the benefit status is one of: active, inactive.

14. The apparatus of embodiment 1, in which the benefit is identified by at least one of: a benefit identifier, a benefit type identifier.

15. The apparatus of embodiment 1, in which the component collection storage is further structured with processor-executable instructions, comprising:

display, a benefit coverage validation success notification associated with the benefit on a screen of the provider's client device.

16. A blockchain-based benefit coverage validation processor-readable, non-transient medium, the medium storing a component collection, the component collection storage structured with processor-executable instructions comprising:

obtain, via the at least one processor, a benefit coverage validation request datastructure, in which the benefit coverage validation request datastructure is structured to specify subscriber ID card data associated with a beneficiary;

determine, via the at least one processor, a blockchain address of a smart contract associated with the beneficiary via the subscriber ID card data;

obtain, via the at least one processor, encrypted benefit coverage data associated with the beneficiary by sending a blockchain transaction to the blockchain address of the smart contract, in which the blockchain transaction is structured to include a transaction signature that proves control over a blockchain address associated with a provider, in which the blockchain address associated with the provider has viewer role authorization to the encrypted benefit coverage data;

obtain, via the at least one processor, an encryption key corresponding to the encrypted benefit coverage data from a key management server, in which the key management server is structured to verify that the provider has viewer role authorization to the encrypted benefit coverage data;

decrypt, via the at least one processor, the encrypted benefit coverage data associated with the beneficiary with the encryption key; and evaluate, via the at least one processor, the decrypted benefit coverage data associated with the beneficiary to determine a benefit status corresponding to a benefit provided by the provider.

17. The medium of embodiment 16, in which the subscriber ID card data is obtained via a wireless communication message from the beneficiary's client device.

18. The medium of embodiment 16, in which the subscriber ID card data is obtained via scanning a barcode displayed by the beneficiary's client device.

19. The medium of embodiment 16, in which the subscriber ID card data is structured to specify at least one of: the blockchain address of a smart contract associated with the beneficiary, a subscriber identifier associated with the beneficiary, an authorization code associated with a provider.

20. The medium of embodiment 16, in which the instructions to determine the blockchain address of the smart contract associated with the beneficiary via the subscriber ID card data are structured as instructions to:

parse, via the at least one processor, the benefit coverage validation request datastructure to determine the blockchain address of the smart contract.

21. The medium of embodiment 16, in which the instructions to determine the blockchain address of the smart contract associated with the beneficiary via the subscriber ID card data are structured as instructions to:

parse, via the at least one processor, the benefit coverage validation request datastructure to determine a subscriber identifier associated with the beneficiary; and query, via the at least one processor, a database to determine a blockchain address associated with the subscriber identifier.

22. The medium of embodiment 16, in which the instructions to determine the blockchain address of the smart contract associated with the beneficiary via the subscriber ID card data are structured as instructions to:

parse, via the at least one processor, the benefit coverage validation request datastructure to determine an authorization code associated with a provider; and query, via the at least one processor, a database to determine a blockchain address associated with the authorization code.

23. The medium of embodiment 16, in which the smart contract is deployed on a private blockchain.

24. The medium of embodiment 16, in which the smart contract is structured to comprise a whitelist of permissioned viewers that includes the blockchain address associated with the provider.

25. The medium of embodiment 16, in which the key management server is a database server.

26. The medium of embodiment 16, in which the key management server is structured to verify that the provider has viewer role authorization to the encrypted benefit coverage data by sending a query to the smart contract to verify that the blockchain address associated with the provider has viewer role authorization to the encrypted benefit coverage data.

27. The medium of embodiment 16, in which the key management server is structured to verify that the provider has viewer role authorization to the encrypted benefit coverage data by sending a query to an internal database to verify that an identifier associated with the provider has viewer role authorization to the encrypted benefit coverage data.

28. The medium of embodiment 16, in which the benefit status is one of: active, inactive.

29. The medium of embodiment 16, in which the benefit is identified by at least one of: a benefit identifier, a benefit type identifier.

30. The medium of embodiment 16, in which the component collection storage is further structured with processor-executable instructions, comprising:

display, a benefit coverage validation success notification associated with the benefit on a screen of the provider's client device.

31. A blockchain-based benefit coverage validation processor-implemented system, comprising:

means to store a component collection;

means to process processor-executable instructions from the component collection, the component collection storage structured with processor-executable instructions including:

obtain, via the at least one processor, a benefit coverage validation request datastructure, in which the benefit coverage validation request datastructure is structured to specify subscriber ID card data associated with a beneficiary;

determine, via the at least one processor, a blockchain address of a smart contract associated with the beneficiary via the subscriber ID card data;

obtain, via the at least one processor, encrypted benefit coverage data associated with the beneficiary by sending a blockchain transaction to the blockchain address of the smart contract, in which the blockchain transaction is structured to include a transaction signature that proves control over a blockchain address associated with a provider, in which the blockchain address associated with the provider has viewer role authorization to the encrypted benefit coverage data;

obtain, via the at least one processor, an encryption key corresponding to the encrypted benefit coverage data from a key management server, in which the key management server is structured to verify that the provider has viewer role authorization to the encrypted benefit coverage data;

decrypt, via the at least one processor, the encrypted benefit coverage data associated with the beneficiary with the encryption key; and evaluate, via the at least one processor, the decrypted benefit coverage data associated with the beneficiary to determine a benefit status corresponding to a benefit provided by the provider.

32. The system of embodiment 31, in which the subscriber ID card data is obtained via a wireless communication message from the beneficiary's client device.

33. The system of embodiment 31, in which the subscriber ID card data is obtained via scanning a barcode displayed by the beneficiary's client device.

34. The system of embodiment 31, in which the subscriber ID card data is structured to specify at least one of: the blockchain address of a smart contract associated with the beneficiary, a subscriber identifier associated with the beneficiary, an authorization code associated with a provider.

35. The system of embodiment 31, in which the instructions to determine the blockchain address of the smart contract associated with the beneficiary via the subscriber ID card data are structured as instructions to:

parse, via the at least one processor, the benefit coverage validation request datastructure to determine the blockchain address of the smart contract.

36. The system of embodiment 31, in which the instructions to determine the blockchain address of the smart contract associated with the beneficiary via the subscriber ID card data are structured as instructions to:

parse, via the at least one processor, the benefit coverage validation request datastructure to determine a subscriber identifier associated with the beneficiary; and query, via the at least one processor, a database to determine a blockchain address associated with the subscriber identifier.

37. The system of embodiment 31, in which the instructions to determine the blockchain address of the smart contract associated with the beneficiary via the subscriber ID card data are structured as instructions to:

parse, via the at least one processor, the benefit coverage validation request datastructure to determine an authorization code associated with a provider; and query, via the at least one processor, a database to determine a blockchain address associated with the authorization code.

38. The system of embodiment 31, in which the smart contract is deployed on a private blockchain.

39. The system of embodiment 31, in which the smart contract is structured to comprise a whitelist of permissioned viewers that includes the blockchain address associated with the provider.

40. The system of embodiment 31, in which the key management server is a database server.

41. The system of embodiment 31, in which the key management server is structured to verify that the provider has viewer role authorization to the encrypted benefit coverage data by sending a query to the smart contract to verify that the blockchain address associated with the provider has viewer role authorization to the encrypted benefit coverage data.

42. The system of embodiment 31, in which the key management server is structured to verify that the provider has viewer role authorization to the encrypted benefit coverage data by sending a query to an internal database to verify that an identifier associated with the provider has viewer role authorization to the encrypted benefit coverage data.

43. The system of embodiment 31, in which the benefit status is one of: active, inactive.

44. The system of embodiment 31, in which the benefit is identified by at least one of: a benefit identifier, a benefit type identifier.

45. The system of embodiment 31, in which the component collection storage is further structured with processor-executable instructions, comprising: display, a benefit coverage validation success notification associated with the benefit on a screen of the provider's client device.

46. A blockchain-based benefit coverage validation processor-implemented process, including processing processor-executable instructions via at least one processor from a component collection stored in at least one memory, the component collection storage structured with processor-executable instructions comprising:

obtain, via the at least one processor, a benefit coverage validation request datastructure, in which the benefit coverage validation request datastructure is structured to specify subscriber ID card data associated with a beneficiary;

determine, via the at least one processor, a blockchain address of a smart contract associated with the beneficiary via the subscriber ID card data;

obtain, via the at least one processor, encrypted benefit coverage data associated with the beneficiary by sending a blockchain transaction to the blockchain address of the smart contract, in which the blockchain transaction is structured to include a transaction signature that proves control over a blockchain address associated with a provider, in which the blockchain address associated with the provider has viewer role authorization to the encrypted benefit coverage data;

obtain, via the at least one processor, an encryption key corresponding to the encrypted benefit coverage data from a key management server, in which the key management server is structured to verify that the provider has viewer role authorization to the encrypted benefit coverage data;

decrypt, via the at least one processor, the encrypted benefit coverage data associated with the beneficiary with the encryption key; and evaluate, via the at least one processor, the decrypted benefit coverage data associated with the beneficiary to determine a benefit status corresponding to a benefit provided by the provider.

47. The process of embodiment 46, in which the subscriber ID card data is obtained via a wireless communication message from the beneficiary's client device.

48. The process of embodiment 46, in which the subscriber ID card data is obtained via scanning a barcode displayed by the beneficiary's client device.

49. The process of embodiment 46, in which the subscriber ID card data is structured to specify at least one of: the blockchain address of a smart contract associated with the beneficiary, a subscriber identifier associated with the beneficiary, an authorization code associated with a provider.

50. The process of embodiment 46, in which the instructions to determine the blockchain address of the smart contract associated with the beneficiary via the subscriber ID card data are structured as instructions to:

parse, via the at least one processor, the benefit coverage validation request datastructure to determine the blockchain address of the smart contract.

51. The process of embodiment 46, in which the instructions to determine the blockchain address of the smart contract associated with the beneficiary via the subscriber ID card data are structured as instructions to:

parse, via the at least one processor, the benefit coverage validation request datastructure to determine a subscriber identifier associated with the beneficiary; and query, via the at least one processor, a database to determine a blockchain address associated with the subscriber identifier.

52. The process of embodiment 46, in which the instructions to determine the blockchain address of the smart contract associated with the beneficiary via the subscriber ID card data are structured as instructions to:

parse, via the at least one processor, the benefit coverage validation request datastructure to determine an authorization code associated with a provider; and query, via the at least one processor, a database to determine a blockchain address associated with the authorization code.

53. The process of embodiment 46, in which the smart contract is deployed on a private blockchain.

54. The process of embodiment 46, in which the smart contract is structured to comprise a whitelist of permissioned viewers that includes the blockchain address associated with the provider.

55. The process of embodiment 46, in which the key management server is a database server.

56. The process of embodiment 46, in which the key management server is structured to verify that the provider has viewer role authorization to the encrypted benefit coverage data by sending a query to the smart contract to verify that the blockchain address associated with the provider has viewer role authorization to the encrypted benefit coverage data.

57. The process of embodiment 46, in which the key management server is structured to verify that the provider has viewer role authorization to the encrypted benefit coverage data by sending a query to an internal database to verify that an identifier associated with the provider has viewer role authorization to the encrypted benefit coverage data.

58. The process of embodiment 46, in which the benefit status is one of: active, inactive.

59. The process of embodiment 46, in which the benefit is identified by at least one of: a benefit identifier, a benefit type identifier.

60. The process of embodiment 46, in which the component collection storage is further structured with processor-executable instructions, comprising:

display, a benefit coverage validation success notification associated with the benefit on a screen of the provider's client device.

DBCV Controller

FIG. 15 shows a block diagram illustrating non-limiting, example embodiments of a DBCV controller. In this embodiment, the DBCV controller 1501 may serve to aggregate, process, store, search, serve, identify, instruct, generate, match, and/or facilitate interactions with a computer through information technology technologies, and/or other related data.

Users, which may be people and/or other systems, may engage information technology systems (e.g., computers) to facilitate information processing. In turn, computers employ processors to process information; such processors 1503 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DBCV controller 1501 may be connected to and/or communicate with entities such as, but not limited to: one or more users from peripheral devices 1512 (e.g., user input devices 1511); an optional cryptographic processor device 1528; and/or a communications network 1513.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The DBCV controller 1501 may be based on computer systems that may comprise, but are not limited to, components such as: a computer systemization 1502 connected to memory 1529.

Computer Systemization

A computer systemization 1502 may comprise a clock 1530, central processing unit ("CPU(s)" and/or "processor (s)" (these terms are used interchangeably throughout the disclosure unless noted to the contrary)) 1503, a memory 1529 (e.g., a read only memory (ROM) 1506, a random access memory (RAM) 1505, etc.), and/or an interface bus 1507, and most frequently, although not necessarily, are all interconnected and/or communicating through a system bus 1504 on one or more (mother) board(s) 1502 having conductive and/or otherwise transportive circuit pathways through which instructions (e.g., binary encoded signals) may travel to effectuate communications, operations, storage, etc. The computer systemization may be connected to a power source 1586; e.g., optionally the power source may be internal. Optionally, a cryptographic processor 1526 may be connected to the system bus. In another embodiment, the cryptographic processor, transceivers (e.g., ICs) 1574, and/or sensor array (e.g., accelerometer, altimeter, ambient light, barometer, global positioning system (GPS) (thereby allowing DBCV controller to determine its location), gyroscope, magnetometer, pedometer, proximity, ultra-violet sensor, etc.) 1573 may be connected as either internal and/or external peripheral devices 1512 via the interface bus I/O 1508 (not pictured) and/or directly via the interface bus 1507. In turn, the transceivers may be connected to antenna(s) 1575, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, EM, etc.); a Broadcom® BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML.8511 UV sensor; a maxim integrated MAX44000 ambient light and infrared proximity sensor; a Texas Instruments® WiLink WL1283 transceiver chip (e.g., providing 802.11n, Bluetooth 3.0, EM, GPS); and/or the like. The system clock may have a crystal oscillator and generates a base signal through the computer systemization's circuit pathways. The clock may be coupled to the system bus and various clock multipliers that may increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple Airpods (Pro)®, glasses, goggles (e.g., Google Glass®), watches, etc.), and/or the like. Often, the processors themselves may incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1529 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the DBCV controller and beyond through various interfaces. Should processing requirements dictate a greater amount speed and/or capacity, distributed processors (e.g., see Distributed DBCV below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the DBCV may be achieved by implementing a microcontroller such as CAST's® R8051XC2 microcontroller; Diligent's® Basys 3 Artix-7, Nexys A7-100T, U192015125IT, etc.; Intel's® MCS 51 (i.e., 8051 microcontroller); and/or the like. Also, to implement certain features of the DBCV, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DBCV component collection (distributed or otherwise) and/or features may be implemented via the microprocessor and/or via embedded components; e.g., via ASIC, coprocessor, DSP, FPGA, and/or the like. Alternately, some implementations of the DBCV may be implemented with embedded components that are configured and used to achieve a variety of features or signal processing.

Depending on the particular implementation, the embedded components may include software solutions, hardware solutions, and/or some combination of both hardware/software solutions. For example, DBCV features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the DBCV features. A hierarchy of programmable interconnects allow logic blocks to be interconnected as needed by the DBCV system designer/administrator, somewhat like a one-chip programmable breadboard. An FPGA's logic blocks can be programmed to perform the operation of basic logic gates such as AND, and NOR, or more complex combinational operators such as decoders or mathematical operations. In most FPGAs, the logic blocks also include memory elements, which may be circuit flip-flops or more complete blocks of memory. In some circumstances, the DBCV may be developed on FPGAs and then migrated into a fixed version that more resembles ASIC implementations. Alternate or coordinating implementations may migrate DBCV controller features to a final ASIC instead of or in addition to FPGAs. Depending on the implementation all of the aforementioned embedded components and microprocessors may be considered the "CPU" and/or "processor" for the DBCV.

Power Source

The power source 1586 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1586 is connected to at least one of the interconnected subsequent components of the DBCV thereby providing an electric current to all subsequent components. In one example, the power source 1586 is connected to the system bus component 1504. In an alternative embodiment, an outside power source 1586 is provided through a connection across the I/O) 1508 interface. For example, Ethernet (with power on Ethernet), IEEE 1394, USB and/or the like connections carry both data and power across the connection and is therefore a suitable source of power.

Interface Adapters

Interface bus(ses) 1507 may accept, connect, and/or communicate to a number of interface adapters, variously although not necessarily in the form of adapter cards, such as but not limited to: input output interfaces (I/O)) 1508, storage interfaces 1509, network interfaces 1510, and/or the like. Optionally, cryptographic processor interfaces 1527 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1509 may accept, communicate, and/or connect to a number of storage devices such as, but not limited to: (removable) storage devices 1514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 1510 may accept, communicate, and/or connect to a communications network 1513. Through a communications network 1513, the DBCV controller is accessible through remote clients 1533b (e.g., computers with web browsers) by users 1533a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed DBCV below), architectures may similarly be employed to pool, load balance, and/or otherwise decrease/increase the communicative bandwidth required by the DBCV controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1510 may be used to engage with various communications network types 1513. For example, multiple network interfaces may be employed to allow for the communication over broadcast, multicast, and/or unicast networks.

Input Output interfaces (I/O)) 1508 may accept, communicate, and/or connect to user, peripheral devices 1512 (e.g., input devices 1511), cryptographic processor devices 1528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1512 may be connected and/or communicate to I/O and/or other facilities of the like such as network interfaces, storage interfaces, directly to the interface bus, system bus, the CPU, and/or the like. Peripheral devices may be external, internal and/or part of the DBCV controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1511 often are a type of peripheral device 512 (see above) and may include: accelerometers, camaras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the DBCV controller may be embodied as an embedded, dedicated, and/or monitor-less (i.e., headless) device, and access may be provided over a network interface connection.

Cryptographic units such as, but not limited to, microcontrollers, processors 1526, interfaces 1527, and/or devices 1528 may be attached, and/or communicate with the DBCV controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+ MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1529. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the DBCV controller and/or a computer systemization may employ various forms of memory 1529. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 1529 may include ROM 1506, RAM 1505, and a storage device 1514. A storage device 1514 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD)), etc.); other processor-readable storage mediums; and/or other devices of the like. Thus, a computer systemization generally employs and makes use of memory.

Component Collection

The memory 1529 may contain a collection of processor-executable application/library/program and/or database components (e.g., including processor-executable instructions) and/or data such as, but not limited to: operating system component(s) 1515 (operating system); information server component(s) 1516 (information server); user interface component(s) 1517 (user interface); Web browser component(s) 1518 (Web browser); database(s) 1519; mail server component(s) 1521; mail client component(s) 1522; cryptographic server component(s) 1520 (cryptographic server); machine learning component 1523; distributed immutable ledger component 1524; the DBCV component(s) 1535 (e.g., which may include PAAG, EBCV 1541-1542, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 1514, they may also be loaded and/or stored in memory such as: cache, peripheral devices, processor registers, RAM, remote storage facilities through a communications network, ROM, various forms of memory, and/or the like.

Operating System

The operating system component 1515 is an executable program component facilitating the operation of the DBCV controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® Jul. 8, 2010; Unix and Unix-like system distributions (such as AT&T's UNIX®; Berkley Software Distribution (BSD)® variations such as Free-BSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the DBCV controller to communicate with other entities through a communications network 1513. Various communication protocols may be used by the DBCV controller as a subcarrier transport mechanism for interaction, such as, but not limited to: multicast, TCP/IP, UDP, unicast, and/or the like.

Information Server

An information server component 1516 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (ILS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DBCV controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DBCV database 1519, operating systems, other program components, user interfaces, Web browsers, and/or the like.

Access to the DBCV database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DBCV. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the DBCV as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D) HTML, FLASH, Java, JavaScript, etc. interface libraries such as, but not limited to, Dojo, jQuery (UI), MooTools, Prototype, script.aculo.us, SWFObject, Yahoo! User Interface®, and/or the like, any of which may be used and) provide a baseline and mechanism of accessing and displaying information graphically to users.

A user interface component 1517 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1518 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D) HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DBCV enabled nodes. The combined application may be nugatory on systems employing Web browsers.

Mail Server

A mail server component 1521 is a stored program component that is executed by a CPU 1503. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C(++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DBCV. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the DBCV mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1522 is a stored program component that is executed by a CPU 1503. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1520 is a stored program component that is executed by a CPU 1503, cryptographic processor 1526, cryptographic processor interface 1527, cryptographic processor device 1528, and/or the like. Cryptographic processor interfaces may allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD) 5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the DBCV may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the DBCV component to engage in secure transactions if so desired. The cryptographic component facilitates the secure accessing of resources on the DBCV and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Machine Learning (ML)

In one non limiting embodiment, the DBCV may include a machine learning component 1523, which may be a stored program component that is executed by a CPU 1503. The machine learning component, alternatively, may run on a set of specialized processors, ASICS, FPGAs, GPU's, and/or the like. The machine learning component may be deployed to execute serially, in parallel, distributed, and/or the like, such as by utilizing cloud computing. The machine learning component may employ an MI, platform such as Amazon Sage Maker, Azure Machine Learning, DataRobot AI Cloud, Google AI Platform, IBM Watson® Studio, and/or the like. The machine learning component may be implemented using an MI framework such as PyTorch, Apache MANet, MathWorks Deep Learning Toolbox, scikit-learn, TensorFlow, XGBoost, and/or the like. The machine learning component facilitates training and/or testing of ML prediction logic data structures (e.g., models) and/or utilizing ML prediction logic data structures (e.g., models) to output ML predictions by the DBCV. The machine learning component may employ various artificial intelligence and/or learning mechanisms such as Reinforcement Learning, Supervised Learning, Unsupervised Learning, and/or the like. The machine learning component may employ ML prediction logic data structure (e.g., model) types such as Bayesian Networks, Classification prediction logic data structures (e.g., models), Decision Trees, Neural Networks (NNs), Regression prediction logic data structures (e.g., models), and/or the like.

Distributed Immutable Ledger (DIL)

In one non limiting embodiment, the DBCV includes a distributed immutable ledger component 1524, which may be a stored program component that is executed by a CPU 1503. The distributed immutable ledger component, alternatively, may run on a set of specialized processors, ASICS, FPGAs, GPUs, and/or the like. The distributed immutable ledger component may be deployed to execute serially, in parallel, distributed, and/or the like, such as by utilizing a peer-to-peer network. The distributed immutable ledger component may be implemented as a blockchain (e.g., public blockchain, private blockchain, hybrid blockchain) that comprises cryptographically linked records (e.g., blocks). The distributed immutable ledger component may employ a platform or network such as Aptos, Avalanche, Bitcoin, Bitcoin Cash, Cosmos, Dogecoin, Ethereum, Litecoin, Monero, Polkadot, Solana, Zcash, and/or the like. The distributed immutable ledger component may employ a consensus mechanism such as proof of authority, proof of space, proof of stake, proof of work, and/or the like. The distributed immutable ledger component may be used to provide functionality such as data storage, cryptocurrency, inventory tracking, non-fungible tokens (NFTs), smart contracts, and/or the like.

The DBCV Database

The DBCV database component 1519 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the DBCV database may be implemented using various other data-structures, such as an array, hash, list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DBCV database is implemented as a data-structure, the use of the DBCV database 1519 may be integrated into another component such as the DBCV component 1535. Also, the database may be implemented as a mix of data structures, objects, programs, relational structures, scripts, and/or the like. Databases may be consolidated and/or distributed in countless variations (e.g., see Distributed DBCV below). Portions of databases, e.g., tables, may be exported and/or imported and thus decentralized and/or integrated.

In another embodiment, the database component (and/or other storage mechanism of the DBCV) may store data immutably so that tampering with the data becomes physically impossible and the fidelity and security of the data may be assured. In some embodiments, the database may be stored to write only or write once, read many (WORM) mediums. In another embodiment, the data may be stored on distributed ledger systems (e.g., via blockchain) so that any tampering to entries would be readily identifiable. In one embodiment, the database component may employ the distributed immutable ledger component DII, 1524 mechanism.

In one embodiment, the database component 1519 includes several tables representative of the schema, tables, structures, keys, entities and relationships of the described database 1519*a-k:*

An accounts table 1519*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routing Number, link WalletsID, accountPrioritAccountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1519*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, user AuthorizationCode, userAccessPrivilges, userPreferences, userRestrictions, and/or the like (the user table may support and/or track multiple entity accounts on a DBCV);

An devices table 1519*c* includes fields such as, but not limited to: deviceID, sensorIDs, accountID, assetIDs, paymentIDs, deviceType, deviceName, deviceManufacturer, deviceModel, device Version, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, device AccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published d at https://www.bluetooth.org/en-us/specification/adopted-specifications, and/or other device specifications, and/or the like;

An apps table 1519*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, app Access Privileges, app Preferences, app Restrictions, portNum, access_API_call, linked_wallets_list, and/or the like;

An assets table 1519*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, asset TargetChannelName, assetName, assetSeries Name, assetSeriesSeason, assetSeries Episode, assetCode, assetQuantity, assetCost, assetPrice, asset Value, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1519*f* includes fields such as, but not limited to: paymentID, accountID, userID, couponID, coupon Value, couponConditions, couponExpiration, paymentType, paymentAccountNo, paymentAccountName, paymentAccountAuthorizationCodes, paymentExpirationDate, paymentCCV, paymentRoutingNo, paymentRouting Type, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1519*g* includes fields such as, but not limited to: transactionID, accountID, assetIDs, deviceIDs, paymentIDs, transactionIDs, userID, merchantID, transaction Type, transactionDate, transaction Time, transaction Amount, transactionQuantity, transactionDetails, products List, product Type, product Title, productsSummary, productParamsList, transactionNo, transaction AccessPrivileges, transactionPreferences, transactionRestrictions, merchantAuthKey, merchantAuthCode, and/or the like;

An merchants table 1519*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1519*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSource Name, adSourceServerIP, adSourceURL, adSourceSecurity Protocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetric Value, adNetworkNchangeServer, adNetworkXchangePortNumber, publisherID, publisher Address, publisherURL, publisher Tag, publisherIndustry, publisher Name, publisherDescription, siteDomain, site URL, siteContent, siteTag, siteContext, siteImpression, siteVisits, siteHeadline, sitePage, site AdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID), merchantID, deviceID, userID, accountID, impressionID, impressionOS, impressionTimeStamp, impressionGeo, impressionAction, impression Type, impression PublisherID, impression PublisherURL, and/or the like;

An ML, table 1519*j* includes fields such as, but not limited to: MLID, predictionLogicStructureID, predictionLogicStructureType, predictionLogicStructureConfiguration, predictionLogicStructureTrainedStructure, predictionLogicStructureTrainingData, predictionLogicStructureTrainingDataConfiguration, predictionLogicStructure TestingData, predictionLogicStructure TestingDataConfiguration, predictionLogicStructureOutputData, predictionLogicStructureOutputDataConfiguration, and/or the like;

A benefits table 1519*k* includes fields such as, but not limited to: benefitsOpaqueID, employeeID, employerID, employeeFirstName, employeeLastName, benefitType, benefit Vendor, benefitCarrier, benefitStatus ActiveInactive, coverageStartDate, coverageEndDate, benefitsPlan Year, groupID_Number, personID, userID, accountID, employeeSmartContractBlockchain Address, employeeBlockchain Address, employeeEncryptionKey, and/or the like.

In one embodiment, the DBCV database may interact with other database systems. For example, employing a distributed database system, queries and data access by search DBCV component may treat the combination of the DBCV database, an integrated data security layer database as a single database entity (e.g., see Distributed DBCV below).

In one embodiment, user programs may contain various user interface primitives, which may serve to update the DBCV. Also, various accounts may require custom database tables depending upon the environments and the types of clients the DBCV may need to serve. It should be noted that any unique fields may be designated as a key field throughout. In an alternative embodiment, these tables have been decentralized into their own databases and their respective database controllers (i.e., individual database controllers for each of the above tables). The DBCV may also be configured to distribute the databases over several computer systemizations and/or storage devices. Similarly, configurations of the decentralized database controllers may be varied by consolidating and/or distributing the various database components 1519*a-k*. The DBCV may be configured to keep track of various settings, inputs, and parameters via database controllers.

The DBCV database may communicate to and/or with other components in a component collection, including itself, and/or facilities of the like. Most frequently, the DBCV database communicates with the DBCV component, other program components, and/or the like. The database may contain, retain, and provide information regarding other nodes and data.

The DBCVs

The DBCV component 1535 is a stored program component that is executed by a CPU via stored instruction code configured to engage signals across conductive pathways of the CPU and ISICI controller components. In one embodiment, the DBCV component incorporates any and/or all combinations of the aspects of the DBCV that were discussed in the previous figures. As such, the DBCV affects accessing, obtaining and the provision of information, services, transactions, and/or the like across various communications networks. The features and embodiments of the DBCV discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., may reduce the capacity and structural infrastructure requirements to support the DBCV's features and facilities, and in many cases reduce the costs, energy consumption/requirements, and extend the life of DBCV's underlying infrastructure; this has the added benefit of making the DBCV more reliable. Similarly, many of the features and mechanisms are designed to be easier for users to use and access, thereby broadening the audience that may enjoy/employ and exploit the feature sets of the DBCV; such ease of use also helps to increase the reliability of the DBCV. In addition, the feature sets include heightened security as noted via the Cryptographic components 1520, 1526, 1528 and throughout, making access to the features and data more reliable and secure The DBCV transforms provider info, add provider transaction request, employee subscriber ID card data datastructure/inputs, via DBCV components (e.g., PAAG, EBCV), into add provider transaction response, benefit coverage validation notification outputs.

The DBCV component facilitates access of information between nodes may be developed by employing various development tools and languages such as, but not limited to: Apache® components, Assembly, ActiveX, binary executables, (ANSI) (Objective-) C(++), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery (UI); MooTools; Prototype; script.aculo.us; Simple Object Access Protocol (SOAP); SWFObject; Yahoo!® User Interface; and/or the like), WebObjects®, and/or the like. In one embodiment, the DBCV server employs a cryptographic server to encrypt and decrypt communications. The DBCV component may communicate to and/or with other components in a component collection, including itself, and/or facilities of the like. Most frequently, the DBCV component communicates with the DBCV database, operating systems, other program components, and/or the like. The DBCV may contain, communicate, generate, obtain, and/or provide program component, system, user, and/or data communications, requests, and/or responses.

Distributed DBCVs

The structure and/or operation of any of the DBCV node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques. Furthermore, any part of sub parts of the DBCV node controller's component collection may be executed on at least one processing unit, where that processing unit may be a sub-unit of a CPU, a core, an entirely different CPU and/or sub-unit at the same location or remotely at a different location, and/or across many multiple such processing units. For example, for load-balancing reasons, parts of the component collection may start to execute on a given CPU core, then the next execution element of the component collection may be moved to execute on another CPU core, on the same, or completely different CPU at the same or different location, e.g., because the CPU may become over taxed with instruction executions, and as such, a scheduler may move instructions at the taxed CPU and/or CPU sub-unit to another CPU and/or CPU sub-unit with a lesser instruction execution load. As such, it may be difficult to predict on which CPU and/or processing sub-unit a process instruction begins to execute and where it will continue and/or conclude execution, as it may be on the same or completely different CPU and/or processing sub-unit.

The configuration of the DBCV controller may depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for DBCV controller and/or DBCV component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration may depend upon the context, environment, and requirements of system deployment.

For example, in some implementations, the DBCV controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

cussed herein. That alternate embodiments may not have been presented for a specific portion of the innovations or that further undescribed alternate embodiments may be available for a portion is not to be considered a disclaimer of those alternate embodiments. It may be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132", $DBserver, $password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
    http://publib.boulder.ibm.com/infocenter/tivihelp/v2r1/
        index.jsp?topic=/com.ibm.      IBMDI.doc/
        referenceguide295.htm
and other parser implementations:
    http://publib.boulder.ibm.com/infocenter/tivihelp/v2r1/
        index.jsp?topic=/com.ibm.      IBMDI.doc/
        referenceguide259.htm
all of which are hereby expressly incorporated by reference.

In order to address various issues and advance the art, the entirety of this application for Distributed Benefits Coverage Validation Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been disregarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DBCV individual and/or enterprise user, database configuration and/or relational model, data type, data transmission and/or network framework, library, syntax structure, and/or the like, various embodiments of the DBCV, may be implemented that allow a great deal of flexibility and customization. For example, aspects of the DBCV may be adapted for auto insurance, property insurance, life insurance, and/or the like. While various embodiments and discussions of the DBCV have included information technology, however, it is to be understood that the embodiments described herein may be readily configured and/or customized for a wide variety of other applications and/or implementations.

What is claimed is:

1. A blockchain-based benefit coverage validation apparatus, comprising:
at least one memory;
a component collection stored in the at least one memory;
at least one processor disposed in communication with the at least one memory, the at least one processor executing processor-executable instructions from the component collection, the component collection stored in the at least one memory structured with processor-executable instructions to:
obtain, via the at least one processor, a benefit coverage validation request datastructure, in which the benefit coverage validation request datastructure is structured to specify subscriber ID card data associated with a beneficiary;
determine, via the at least one processor, a blockchain address of a smart contract associated with the beneficiary via the subscriber ID card data;
obtain, via the at least one processor, encrypted benefit coverage data associated with the beneficiary by sending a blockchain transaction to the blockchain address of the smart contract, in which the blockchain transaction is structured to include a transaction signature that proves control over a blockchain address associated with a provider, in which the blockchain address associated with the provider has viewer role authorization to the encrypted benefit coverage data;

obtain, via the at least one processor, an encryption key corresponding to the encrypted benefit coverage data from a key management server, in which the key management server is structured to verify that the provider has viewer role authorization to the encrypted benefit coverage data;
decrypt, via the at least one processor, the encrypted benefit coverage data associated with the beneficiary with the encryption key; and
evaluate, via the at least one processor, the decrypted benefit coverage data associated with the beneficiary to determine a benefit status corresponding to a benefit provided by the provider.

2. The blockchain-based benefit coverage validation apparatus of claim 1, in which the subscriber ID card data is obtained via a wireless communication message from a beneficiary's client device.

3. The blockchain-based benefit coverage validation apparatus of claim 1, in which the subscriber ID card data is obtained via scanning a barcode displayed by a beneficiary's client device.

4. The blockchain-based benefit coverage validation apparatus of claim 1, in which the subscriber ID card data is structured to specify at least one of: the blockchain address of a smart contract associated with the beneficiary, a subscriber identifier associated with the beneficiary, an authorization code associated with a provider.

5. The blockchain-based benefit coverage validation apparatus of claim 1, in which the instructions to determine the blockchain address of the smart contract associated with the beneficiary via the subscriber ID card data are structured as instructions to:
parse, via the at least one processor, the benefit coverage validation request datastructure to determine the blockchain address of the smart contract.

6. The blockchain-based benefit coverage validation apparatus of claim 1, in which the instructions to determine the blockchain address of the smart contract associated with the beneficiary via the subscriber ID card data are structured as instructions to:
parse, via the at least one processor, the benefit coverage validation request datastructure to determine a subscriber identifier associated with the beneficiary; and
query, via the at least one processor, a database to determine a blockchain address associated with the subscriber identifier.

7. The blockchain-based benefit coverage validation apparatus of claim 1, in which the instructions to determine the blockchain address of the smart contract associated with the beneficiary via the subscriber ID card data are structured as instructions to:
parse, via the at least one processor, the benefit coverage validation request datastructure to determine an authorization code associated with a provider; and
query, via the at least one processor, a database to determine a blockchain address associated with the authorization code.

8. The blockchain-based benefit coverage validation apparatus of claim 1, in which the smart contract is deployed on a private blockchain.

9. The blockchain-based benefit coverage validation apparatus of claim 1, in which the smart contract is structured to comprise a whitelist of permissioned viewers that includes the blockchain address associated with the provider.

10. The blockchain-based benefit coverage validation apparatus of claim 1, in which the key management server is a database server.

11. The blockchain-based benefit coverage validation apparatus of claim 1, in which the key management server is structured to verify that the provider has viewer role authorization to the encrypted benefit coverage data by sending a query to the smart contract to verify that the blockchain address associated with the provider has viewer role authorization to the encrypted benefit coverage data.

12. The blockchain-based benefit coverage validation apparatus of claim 1, in which the key management server is structured to verify that the provider has viewer role authorization to the encrypted benefit coverage data by sending a query to an internal database to verify that an identifier associated with the provider has viewer role authorization to the encrypted benefit coverage data.

13. The blockchain-based benefit coverage validation apparatus of claim 1, in which the benefit status is one of: active, inactive.

14. The blockchain-based benefit coverage validation apparatus of claim 1, in which the benefit is identified by at least one of: a benefit identifier, a benefit type identifier.

15. The blockchain-based benefit coverage validation apparatus of claim 1, in which the component collection stored in the at least one memory is further structured with processor-executable instructions to, comprising:
display, a benefit coverage validation success notification associated with the benefit on a screen of a provider's client device.

16. A blockchain-based benefit coverage validation processor-readable, non-transient medium, the medium storing a component collection, the component collection structured with processor-executable instructions that, when executed by at least one processor, cause the at least one processor to:
obtain, via the at least one processor, a benefit coverage validation request datastructure, in which the benefit coverage validation request datastructure is structured to specify subscriber ID card data associated with a beneficiary;
determine, via the at least one processor, a blockchain address of a smart contract associated with the beneficiary via the subscriber ID card data;
obtain, via the at least one processor, encrypted benefit coverage data associated with the beneficiary by sending a blockchain transaction to the blockchain address of the smart contract, in which the blockchain transaction is structured to include a transaction signature that proves control over a blockchain address associated with a provider, in which the blockchain address associated with the provider has viewer role authorization to the encrypted benefit coverage data;
obtain, via the at least one processor, an encryption key corresponding to the encrypted benefit coverage data from a key management server, in which the key management server is structured to verify that the provider has viewer role authorization to the encrypted benefit coverage data;
decrypt, via the at least one processor, the encrypted benefit coverage data associated with the beneficiary with the encryption key; and
evaluate, via the at least one processor, the decrypted benefit coverage data associated with the beneficiary to determine a benefit status corresponding to a benefit provided by the provider.

17. A blockchain-based benefit coverage validation processor implemented system, comprising:

means to store a component collection;
means to process processor-executable instructions from the component collection, the component collection structured with processor-executable instructions that, when executed by at least one processor, cause the at least one processor to:
obtain, via the at least one processor, a benefit coverage validation request datastructure, in which the benefit coverage validation request datastructure is structured to specify subscriber ID card data associated with a beneficiary;
determine, via the at least one processor, a blockchain address of a smart contract associated with the beneficiary via the subscriber ID card data;
obtain, via the at least one processor, encrypted benefit coverage data associated with the beneficiary by sending a blockchain transaction to the blockchain address of the smart contract, in which the blockchain transaction is structured to include a transaction signature that proves control over a blockchain address associated with a provider, in which the blockchain address associated with the provider has viewer role authorization to the encrypted benefit coverage data;
obtain, via the at least one processor, an encryption key corresponding to the encrypted benefit coverage data from a key management server, in which the key management server is structured to verify that the provider has viewer role authorization to the encrypted benefit coverage data;
decrypt, via the at least one processor, the encrypted benefit coverage data associated with the beneficiary with the encryption key; and
evaluate, via the at least one processor, the decrypted benefit coverage data associated with the beneficiary to determine a benefit status corresponding to a benefit provided by the provider.

18. A blockchain-based benefit coverage validation processor-implemented process, including processing processor-executable instructions via at least one processor from a component collection stored in at least one memory, the component collection stored in the at least one memory structured with processor-executable instructions comprising:
obtaining, via the at least one processor, a benefit coverage validation request datastructure, in which the benefit coverage validation request datastructure is structured to specify subscriber ID card data associated with a beneficiary;
determining, via the at least one processor, a blockchain address of a smart contract associated with the beneficiary via the subscriber ID card data;
obtaining, via the at least one processor, encrypted benefit coverage data associated with the beneficiary by sending a blockchain transaction to the blockchain address of the smart contract, in which the blockchain transaction is structured to include a transaction signature that proves control over a blockchain address associated with a provider, in which the blockchain address associated with the provider has viewer role authorization to the encrypted benefit coverage data;
obtaining, via the at least one processor, an encryption key corresponding to the encrypted benefit coverage data from a key management server, in which the key management server is structured to verify that the provider has viewer role authorization to the encrypted benefit coverage data;

decrypting, via the at least one processor, the encrypted benefit coverage data associated with the beneficiary with the encryption key; and evaluating, via the at least one processor, the decrypted benefit coverage data associated with the beneficiary to determine a benefit status corresponding to a benefit provided by the provider.

* * * * *